(12) United States Patent
Zhang et al.

(10) Patent No.: US 12,075,539 B2
(45) Date of Patent: Aug. 27, 2024

(54) BACKLIGHT CONTROL CIRCUIT, CONTROL METHOD THEREOF, AND DISPLAY TERMINAL

(71) Applicant: HONOR DEVICE CO., LTD., Guangdong (CN)

(72) Inventors: Shixiong Zhang, Shenzhen (CN); Sooyoung Woo, Shenzhen (CN); Min Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 124 days.

(21) Appl. No.: 17/618,079

(22) PCT Filed: Oct. 12, 2020

(86) PCT No.: PCT/CN2020/120474
§ 371 (c)(1),
(2) Date: Dec. 10, 2021

(87) PCT Pub. No.: WO2021/082895
PCT Pub. Date: May 6, 2021

(65) Prior Publication Data
US 2022/0322511 A1 Oct. 6, 2022

(30) Foreign Application Priority Data
Oct. 31, 2019 (CN) .......................... 201911055090.3

(51) Int. Cl.
*H05B 45/46* (2020.01)
*G09G 3/34* (2006.01)
(Continued)

(52) U.S. Cl.
CPC ........... *H05B 45/46* (2020.01); *G09G 3/3406* (2013.01); *H05B 45/14* (2020.01);
(Continued)

(58) Field of Classification Search
CPC ... H05B 45/14; H05B 45/46; G02F 1/133603; G02F 1/133612; G09G 3/3406; G09G 2330/021
See application file for complete search history.

(56) References Cited

U.S. PATENT DOCUMENTS

| | | | |
|---|---|---|---|
| 7,999,785 B2* | 8/2011 | Ye | H05B 45/46 315/308 |
| 8,035,313 B2* | 10/2011 | Wendt | H05B 45/20 315/315 |

(Continued)

FOREIGN PATENT DOCUMENTS

| | | | |
|---|---|---|---|
| CN | H0990320 A | 4/1997 | |
| CN | 101034539 A | 9/2007 | |

(Continued)

*Primary Examiner* — Amare Mengistu
*Assistant Examiner* — Jennifer L Zubajlo
(74) *Attorney, Agent, or Firm* — Fish & Richardson P.C.

(57) ABSTRACT

A backlight control circuit is provided, which includes a driver circuit and a power conversion circuit. The driver circuit includes a feedback output terminal and at least one channel port. The channel port is coupled to a first terminal of a light string group. The driver circuit is configured to obtain a voltage of each channel port, and enable the feedback output terminal to provide a current feedback signal based on the voltage Vch. The power conversion circuit is coupled to the feedback output terminal and includes a voltage output terminal. The voltage output terminal is configured to provide a supply voltage for a second terminal of each light string group. The power conversion circuit is configured to perform voltage conversion on an input voltage, and increase or decrease the supply voltage based on the current feedback signal.

16 Claims, 11 Drawing Sheets

(51) Int. Cl.
*H05B 45/14* (2020.01)
*G02F 1/1335* (2006.01)
*G02F 1/13357* (2006.01)

(52) U.S. Cl.
CPC .. *G02F 1/133603* (2013.01); *G02F 1/133612* (2021.01); *G09G 2330/021* (2013.01)

(56) References Cited

U.S. PATENT DOCUMENTS

| | | | |
|---|---|---|---|
| 8,106,877 B2 | 1/2012 | Park et al. | |
| 8,314,757 B2 * | 11/2012 | Osaka | H05B 45/46 345/55 |
| 8,552,971 B2 * | 10/2013 | Ishikawa | G09G 3/3426 362/97.3 |
| 8,581,830 B2 * | 11/2013 | Han | G09G 3/3426 315/308 |
| 8,648,545 B2 * | 2/2014 | Lee | H05B 45/46 315/308 |
| 8,760,068 B1 * | 6/2014 | Viviani | H05B 45/3725 315/250 |
| 11,061,273 B2 | 7/2021 | Gamperl | |
| 2007/0114951 A1 * | 5/2007 | Tsen | H05B 45/46 315/291 |
| 2008/0094008 A1 | 4/2008 | Liu | |
| 2009/0187925 A1 * | 7/2009 | Hu | H05B 45/46 719/327 |
| 2010/0033109 A1 | 2/2010 | Liu et al. | |
| 2010/0141163 A1 | 6/2010 | Ye et al. | |
| 2010/0164403 A1 * | 7/2010 | Liu | H05B 45/347 315/297 |
| 2010/0194299 A1 * | 8/2010 | Ye | H05B 45/46 315/192 |
| 2012/0049741 A1 * | 3/2012 | Ye | H05B 45/3725 315/192 |
| 2013/0169190 A1 * | 7/2013 | Fujita | H05B 47/00 315/307 |
| 2013/0285571 A1 * | 10/2013 | Li | H05B 45/46 315/297 |
| 2014/0097762 A1 * | 4/2014 | Ide | H05B 45/397 315/192 |
| 2015/0181671 A1 | 6/2015 | Szczeszynski et al. | |
| 2017/0325307 A1 | 11/2017 | Lee et al. | |

FOREIGN PATENT DOCUMENTS

| | | | |
|---|---|---|---|
| CN | 101162569 A | | 4/2008 |
| CN | 101237648 A | | 8/2008 |
| CN | 201116672 Y | | 9/2008 |
| CN | 101841949 A | | 9/2010 |
| CN | 102123536 A | | 7/2011 |
| CN | 102123536 A | * | 7/2011 |
| CN | 102298908 A | | 12/2011 |
| CN | 102523406 A | | 6/2012 |
| CN | 102637412 A | | 8/2012 |
| CN | 202796007 U | | 3/2013 |
| CN | 203086827 U | | 7/2013 |
| CN | 203086827 U | * | 7/2013 |
| CN | 103310757 A | | 9/2013 |
| CN | 103345903 A | | 10/2013 |
| CN | 109156057 A | | 1/2019 |
| CN | 109523957 A | | 3/2019 |
| KR | 20170118331 A | | 10/2017 |
| RU | 2009117223 A | | 11/2010 |
| WO | 2013159371 A1 | | 10/2013 |
| WO | 2018198594 A1 | | 11/2018 |

* cited by examiner

US 12,075,539 B2

BACKLIGHT CONTROL CIRCUIT, CONTROL METHOD THEREOF, AND DISPLAY TERMINAL

This application is a national stage of International Application No. PCT/CN2020/120474, filed on Oct. 12, 2020, which claims priority to Chinese Patent Application No. 201911055090.3, filed on Oct. 31, 2019. Both of the aforementioned applications are hereby incorporated by reference in their entireties.

TECHNICAL FIELD

This application relates to the field of display technologies, and in particular, to a backlight control circuit, a control method thereof, and a display terminal.

BACKGROUND

Liquid crystal displays (liquid crystal display, LCD) are increasingly used in the high-performance display field because of features such as a small size, low power consumption, no radiation, and comparatively low manufacturing costs. An LCD includes a liquid crystal display panel and a backlight unit used to provide a light source for the liquid crystal display panel. Compared with an edge-lit backlight unit, a direct backlight unit can perform local dimming, and has a better display effect.

Currently, the direct backlight unit includes a plurality of light strings and a driver IC coupled to the light strings. However, in a display process of the LCD, forward voltages (forward voltage, VF) of the light strings, that is, voltages corresponding to a rated current, vary with a temperature. As a result, voltage values of ports that are in the driver IC and that are coupled to the light strings change, and a phenomenon exists that the voltage values of the ports are inconsistent. If a voltage of a port is comparatively high, power consumption of the driver IC is comparatively high.

SUMMARY

Embodiments of this application provide a backlight control circuit, a control method thereof, and a display terminal, to reduce a difference between voltages of ports in a driver IC, so that the driver IC operates in a proper operating interval, thereby reducing power consumption and improving efficiency.

To achieve the foregoing objective, the following technical solutions are used in this application.

According to one aspect of the embodiments of this application, a backlight control circuit is provided. The backlight control circuit is configured to drive at least one light string group. The light string group includes a plurality of light strings connected in parallel. In addition, the backlight control circuit includes a driver circuit and a power conversion circuit. The driver circuit includes a feedback output terminal and at least one channel port. The channel port is coupled to a first terminal of the light string group. The driver circuit is configured to obtain a voltage Vch of each channel port, and enable the feedback output terminal to provide a current feedback signal based on the voltage Vch. The power conversion circuit is coupled to the feedback output terminal and includes a voltage output terminal. The voltage output terminal is configured to provide a supply voltage for a second terminal of each light string group. The power conversion circuit is configured to perform voltage conversion on an input voltage, and increase or decrease the supply voltage based on the current feedback signal. In this way, the voltage Vch of each channel port of the driver circuit can be kept within a specific range. This avoids abnormal luminosity of the light string group caused by a voltage of the first terminal of the light string group being lower than a cut-in voltage or knee voltage of the channel port, or avoids an increase in power consumption of the driver circuit caused by an excessively high voltage of the first terminal of the light string group. In conclusion, on the one hand, in the backlight control circuit provided in the embodiments of this application, the feedback output terminal that can provide the current feedback signal is disposed in the driver circuit, and the feedback output terminal is coupled to the power conversion circuit. This can enable the driver circuit to provide the current feedback signal for the power conversion circuit based on the voltage Vch of each channel port of the driver circuit in real time. Based on this, the power conversion circuit can perform, in real time based on the current feedback signal, bidirectional adjustment on the supply voltage output by the voltage output terminal of the power conversion circuit, that is, increase the supply voltage or decrease the supply voltage. In this way, in a process of displaying by a display terminal, the supply voltage received by the second terminal of the light string group can be adjusted within a specific range. This can avoid that the voltage Vch of each channel port of the driver circuit remains in a comparatively high or low state for a long time, reduce a difference between the voltages Vch1 of the channel ports of the driver circuit, and thus finally reduce power consumption of the driver circuit. On the other hand, a feedback signal provided by the feedback output terminal that is of the driver circuit and that is coupled to the power conversion circuit is a current feedback signal. Compared with a voltage signal, the current signal is not affected by a distance between the driver circuit and the power conversion circuit, and therefore no comparatively large fluctuation is produced, so that signal interference caused by cabling noise can be reduced.

Optionally, the driver circuit is specifically configured to compare the voltage Vch of each channel port with a first preset voltage VL and a second preset voltage VH, where VL<VH. In addition, the driver circuit is specifically further configured to: when the voltage Vch of any channel port is lower than the first preset voltage VL, enable the feedback output terminal to provide a first current I1 as the current feedback signal, where the first current I1 is used to increase the supply voltage; or when the voltages Vch of all the channel ports are higher than the second preset voltage VH, enable the feedback output terminal to provide a second current I2 as the current feedback signal, where the second current I2 is used to decrease the supply voltage. The first current I1 and the second current I2 have opposite directions. In conclusion, the feedback output terminal of the driver circuit can provide the first current I1 (that is, a sink current) to raise the supply voltage output by the voltage output terminal of the power conversion circuit, and the feedback output terminal of the driver circuit can also provide the second current I2 (that is, a source current) to lower the supply voltage output by the voltage output terminal of the power conversion circuit. Therefore, the backlight control circuit provided in the embodiments of this application can perform bidirectional adjustment on the voltage of the second terminal of the light string group.

Optionally, the driver circuit includes a comparator, a first current source, and a second current source. An input terminal of the comparator is connected to the channel ports. A first output terminal of the comparator is coupled to a control terminal of the first current source, and a second output terminal of the comparator is coupled to a control terminal of the second current source. The comparator is configured to compare the voltage Vch of each channel port with the first preset voltage VL and the second preset voltage VH, where VL<VH. When the voltage Vch of any channel port is lower than the first preset voltage VL, the first output terminal outputs a first control signal. When the voltages Vch of all the channel ports are higher than the second preset voltage VH, the second output terminal outputs a second control signal. A first electrode of the first current source is coupled to the feedback output terminal, and a second electrode of the first current source is coupled to a first voltage terminal. The first current source is configured to receive the first control signal, and the feedback output terminal provides the first current I1. A first electrode of the second current source is coupled to a second voltage terminal, and a second electrode of the second current source is coupled to the feedback output terminal. The second current source is configured to receive the second control signal, and the feedback output terminal provides the second current I2. The first voltage terminal is configured to output a first voltage V1, and the second voltage terminal is configured to output a second voltage V2, where |V1|<|V2|. The feedback output terminal of the driver circuit can provide the first current I1 (that is, the sink current), and can also provide the second current I2 (that is, the source current). Technical effects are the same as those described above, and details are not described herein again.

Optionally, the power conversion circuit includes a first resistor that has a resistance value R1. A first terminal of the first resistor is coupled to the voltage output terminal, and a second terminal of the first resistor is coupled to the feedback output terminal.

Optionally, the backlight control circuit further includes a second resistor. A first terminal of the second resistor is coupled to the second terminal of the first resistor, and a second terminal of the second resistor is coupled to the feedback output terminal of the driver circuit. The second resistor is configured to perform impedance matching on the second terminal of the first resistor and the feedback output terminal.

Optionally, the driver circuit is specifically further configured to: when the voltage Vch of any channel port is lower than the first preset voltage VL for S consecutive times, increase, by a current variation ΔI in a step manner for S consecutive times, the first current I1 provided by the feedback output terminal, where S≥2, and S is a positive integer. In addition, the power conversion circuit is specifically further configured to increase, by a voltage variation ΔV based on the first current I1 each time, the voltage output by the voltage output terminal. In this case, when the driver circuit may continuously detect the voltages Vch of all the channel ports for every frame, and the driver circuit detects that the voltage Vch of any channel port is lower than the first preset voltage VL for S consecutive times (for example, the feedback output terminal outputs the first current I1 once for every two frames, and duration of S times is S×2 frames, that is, the driver circuit detects that the voltage Vch of any channel port is lower than the first preset voltage VL for S×2 consecutive frames), the first current I1 provided by the feedback output terminal increases by the current variation ΔI in the step manner for S consecutive times. Therefore, a current value of the first current I1 provided by the feedback output terminal for the $S^{th}$ time is S×ΔI. The power conversion circuit increases, by the voltage variation ΔV based on the first current I1 each time, the voltage output by the voltage output terminal. Therefore, the voltage output by the voltage output terminal Vout of the power conversion circuit for the $S^{th}$ time increases by S×ΔV on a basis of an original voltage. In addition, for the foregoing voltage variation, ΔV1=|ΔI|×R1. In this way, a value of the voltage variation ΔV can be adjusted by adjusting the resistance value of the first resistor.

Optionally, the driver circuit is specifically further configured to: after the first current I1 provided by the feedback output terminal increases by the current variation ΔI in the step manner for S consecutive times, determine that the feedback output terminal is in a high-impedance state when the voltage Vch of any channel port is lower than the first preset voltage VL. In a plurality of light string groups, there is a light string that is in an open-circuit state. Therefore, no matter how a voltage value of the supply voltage output by the voltage output terminal of the power conversion circuit is increased, the voltage of the channel port, to which the second terminal of the light string that is in the open-circuit state is coupled, is still lower than the first preset voltage VL. In this case, the driver circuit may output an open-circuit signal to a control system of the display terminal for open-circuit detection.

Optionally, the driver circuit is specifically further configured to: when the voltages Vch of all the channel ports are higher than the second preset voltage VH for N consecutive times, decrease, by the current variation ΔI in a step manner for N consecutive times, the second current I2 provided by the feedback output terminal, where N≥2, and N is a positive integer. The power conversion circuit is specifically further configured to decrease, by the voltage variation ΔV based on the second current I1 each time, the voltage output by the voltage output terminal.

In this case, when the driver circuit may continuously detect the voltages Vch of all the channel ports for every frame, and the driver circuit detects that the voltages Vch of all the channel ports are higher than the second preset voltage VH for N consecutive times, the second current I2 provided by the feedback output terminal decreases by the current variation ΔI in the step manner for N consecutive times. Therefore, a current value of the second current I2 provided by the feedback output terminal for the $N^{th}$ time is N×ΔI. The power conversion circuit decreases, by the voltage variation ΔV based on the second current I2 each time, the voltage output by the voltage output terminal. Therefore, the voltage output by the voltage output terminal Vout of the power conversion circuit for the $N^{th}$ time decreases by N×ΔV on a basis of an original voltage. In addition, for the foregoing voltage variation, ΔV1=|ΔI|×R1. Technical effects of the first resistor R1 are the same as those described above, and details are not described herein again.

Optionally, the driver circuit further includes a plurality of gating ports and a power supply port that is coupled to each gating port, and the power supply port is further coupled to the voltage output terminal of the power conversion circuit. The plurality of light string groups are arranged in an array. The second terminals of the plurality of light string groups in a same row are coupled to one gating port. The first terminals of the light string groups in a same column are coupled to one channel port of the driver circuit. In this way, one channel port can be separately coupled to the first terminals of the light string groups in the same column, thereby reducing a quantity of channel ports in the driver circuit.

Optionally, the voltage output terminal of the power conversion circuit is coupled to the first terminal of each light string group. In this way, the voltage output terminal of the power conversion circuit can simultaneously provide the supply voltage for the second terminals of the light string groups.

According to another aspect of the embodiments of this application, a control method of a backlight control circuit is provided. The backlight control circuit is configured to drive at least one light string group. The light string group includes a plurality of light strings connected in parallel. The backlight control circuit includes a driver circuit and a power conversion circuit. The driver circuit includes a feedback output terminal and at least one channel port. The channel port is coupled to a first terminal of the light string group. The power conversion circuit is coupled to the feedback output terminal and includes a voltage output terminal. In addition, the control method includes: First, the driver circuit obtains a voltage Vch of the channel port, and enables the feedback output terminal to provide a current feedback signal based on the voltage Vch. Then, the power conversion circuit increases or decreases, based on the current feedback signal, a supply voltage output by the voltage output terminal. The control method of the backlight control circuit has same technical effects as those of the backlight control circuit provided in the foregoing embodiments, and details are not described herein again.

Optionally, that the driver circuit obtains a voltage Vch of the channel port and provides a current feedback signal specifically includes: First, the driver circuit compares the voltage Vch of each channel port with a first preset voltage VL and a second preset voltage VH, where VL<VH. Then, when the voltage Vch of any channel port is lower than the first preset voltage VL, the feedback output terminal of the driver circuit provides a first current I1 as the current feedback signal, where the first current I1 is used to increase the supply voltage; or when the voltages Vch of all the channel ports are higher than the second preset voltage, the feedback output terminal of the driver circuit provides a second current I2 as the current feedback signal, where the second current I2 is used to decrease the supply voltage. The first current I1 and the second current I2 have opposite directions. The feedback output terminal of the driver circuit can provide the first current I1 (that is, a sink current), and can also provide the second current I2 (that is, a source current). Technical effects are the same as those described above, and details are not described herein again.

Optionally, the driver circuit includes a comparator, a first current source, and a second current source. An input terminal of the comparator is connected to the channel ports. A first output terminal of the comparator is coupled to a control terminal of the first current source. A first electrode of the first current source is coupled to the feedback output terminal, and a second electrode of the first current source is coupled to a first voltage terminal. A second output terminal of the comparator is coupled to a control terminal of the second current source. A first electrode of the second current source is coupled to a second voltage terminal, and a second electrode of the second current source is coupled to the feedback output terminal. The first voltage terminal is configured to output a first voltage V1, and the second voltage terminal is configured to output a second voltage V2, where |V1|<|V2|. Based on this, that the driver circuit obtains a voltage Vch of the channel port and provides a current feedback signal specifically includes: First, the comparator compares the voltage Vch of each channel port with the first preset voltage VL and the second preset voltage VH, where VL<VH. Then, when the voltage Vch of any channel port is lower than the first preset voltage V, the first output terminal of the comparator outputs a first control signal, the first current source receives the first control signal, and the feedback output terminal provides the first current I1; or when the voltages Vch of all the channel ports are higher than the second preset voltage, the second output terminal of the comparator outputs a second control signal, the second current source receives the second control signal, and the feedback output terminal provides the second current I2. The feedback output terminal of the driver circuit can provide the first current I1 (that is, the sink current), and can also provide the second current I2 (that is, the source current). Technical effects are the same as those described above, and details are not described herein again.

Optionally, the power conversion circuit includes a first resistor that has a resistance value R1. A first terminal of the first resistor is coupled to the voltage output terminal, and a second terminal of the first resistor is coupled to the feedback output terminal. That the driver circuit obtains a voltage Vch of the channel port, and enables the feedback output terminal to provide a current feedback signal based on the voltage Vch includes: When the voltage Vch of any channel port is lower than the first preset voltage VL for S consecutive times, the driver circuit increases, by a current variation ΔI in a step manner for S consecutive times, the first current I1 provided by the feedback output terminal, where S≥2, and S is a positive integer. That the power conversion circuit increases or decreases, based on the current feedback signal, a supply voltage output by the voltage output terminal includes: The power conversion circuit increases, by a voltage variation ΔV based on the first current I1 each time, the voltage output by the voltage output terminal. For the voltage variation, ΔV1=|ΔI|×R1. Technical effects of the driver circuit, the power conversion circuit, and the first resistor are the same as those described above, and details are not described herein again.

Optionally, the method further includes: first, after the first current I1 provided by the feedback output terminal of the driver circuit increases by the current variation ΔI in the step manner for S consecutive times, determining that the feedback output terminal of the driver circuit is in a high-impedance state when the voltage Vch of any channel port is lower than the first preset voltage V; and then, restoring the voltage output by the voltage output terminal of the power conversion circuit to an initial voltage. Technical effects of implementing open-circuit detection by using the foregoing method are the same as those described above, and details are not described herein again.

Optionally, the power conversion circuit includes a first resistor that has a resistance value R1. A first terminal of the first resistor is coupled to the voltage output terminal, and a second terminal of the first resistor is coupled to the feedback output terminal. That the driver circuit obtains a voltage Vch of the channel port, and enables the feedback output terminal to provide a current feedback signal based on the voltage Vch includes: When the voltages Vch of all the channel ports are higher than the second preset voltage VH for N consecutive times, the driver circuit decreases, by the current variation ΔI in a step manner for N consecutive times, the second current I2 provided by the feedback output terminal, where N≥2, and N is a positive integer. That the power conversion circuit increases or decreases, based on the current feedback signal, a supply voltage output by the voltage output terminal includes: The power conversion circuit decreases, by the voltage variation ΔV based on the second current I1 each time, the voltage output by the voltage output terminal. For the voltage variation, ΔV1=|ΔI|×R1. Technical effects of the driver circuit, the power conversion circuit, and the first resistor are the same as those described above, and details are not described herein again.

According to another aspect of the embodiments of this application, a display terminal is provided, including a liquid crystal display panel and a backlight unit configured to provide a light source for the liquid crystal display panel. The backlight unit includes a plurality of light string groups and a backlight control circuit. The light string group includes a plurality of light strings connected in parallel. Each light string includes a plurality of light emitting devices connected in series. In addition, the backlight control circuit includes a driver circuit and a power conversion circuit. The driver circuit includes a feedback output terminal and at least one channel port. The channel port is coupled to first terminals of the light string groups. The driver circuit is configured to obtain a voltage Vch of each channel port, and enable the feedback output terminal to provide a current feedback signal based on the voltage Vch. The power conversion circuit is coupled to the feedback output terminal and includes a voltage output terminal. The voltage output terminal is configured to provide a supply voltage for a second terminal of each light string group. The power conversion circuit is configured to increase or decrease, based on the current feedback signal, the supply voltage output by the voltage output terminal. The display terminal has same technical effects as those of the backlight control circuit provided in the foregoing embodiments, and details are not described herein again.

Optionally, the liquid crystal display panel includes a plurality of sub-pixels arranged in an array. The plurality of light string groups are arranged in an array. A vertical projection, on the backlight unit, of a region in which M×N sub-pixels are located overlaps a region in which one light string group is located, where M≥1, N≥1, and N and M are positive integers. In this way, one channel port of the driver circuit can control brightness of at least one light string group, so that brightness of each light string does not need to be controlled separately. In addition, the region in which the light string group is located may correspond to the region in which the M×N sub-pixels are located on the liquid crystal display panel, thereby implementing local dimming for an image displayed by the display terminal.

Optionally, the driver circuit further includes a plurality of gating ports and a power supply port that is coupled to each gating port, and the power supply port is further coupled to the voltage output terminal of the power conversion circuit. The backlight unit further includes a plurality of second signal lines and a plurality of first signal lines. One second signal line is separately coupled to one gating port and the second terminals of the plurality of light string groups that are in a same row. One first signal line is separately coupled to one channel port of the driver circuit and the first terminals of light string groups that are in a same column. In this way, the power supply port of the driver circuit can provide the supply voltage for each gating port one by one. In addition, the plurality of first signal lines may separately transfer a voltage of the first terminal of each light string group in the same row to each channel port row by row. In this case, the driver circuit may be configured to obtain the voltage of each channel port, and generate the current feedback signal based on a value of the voltage of each channel port. In addition, one channel port can be separately coupled to the first terminals of the light string groups in the same column, thereby reducing a quantity of channel ports in the driver circuit.

According to another aspect of the embodiments of this application, a driver circuit is provided. The driver circuit includes a feedback output terminal and at least one channel port. The channel port is coupled to a first terminal of a light string group. The driver circuit is configured to obtain a voltage Vch of each channel port, and enable the feedback output terminal to provide a current feedback signal for a power conversion circuit based on the voltage Vch, so that the power conversion circuit increases or decreases an output voltage based on the current feedback signal. Technical effects of the driver circuit are the same as those described above, and details are not described herein again.

Optionally, the driver circuit is specifically configured to compare the voltage Vch of each channel port with a first preset voltage VL and a second preset voltage VH, where VL<VH. In addition, the driver circuit is specifically further configured to: when the voltage Vch of any channel port is lower than the first preset voltage VL, enable the feedback output terminal to provide a first current I1 as the current feedback signal, where the first current I1 is used to increase the supply voltage; or when the voltages Vch of all the channel ports are higher than the second preset voltage VH, enable the feedback output terminal to provide a second current I2 as the current feedback signal, where the second current I2 is used to decrease the supply voltage. The first current I1 and the second current I2 have opposite directions. Technical effects of the first current I1 and the second current I2 are the same as those described above, and details are not described herein again.

Optionally, the driver circuit includes a comparator, a first current source, and a second current source. An input terminal of the comparator is connected to the channel ports, a first output terminal of the comparator is coupled to a control terminal of the first current source, and a second output terminal of the comparator is coupled to a control terminal of the second current source. The comparator is configured to compare the voltage Vch of each channel port with the first preset voltage VL and the second preset voltage VH, where VL<VH. When the voltage Vch of any channel port is lower than the first preset voltage VL, the first output terminal outputs a first control signal. When the voltages Vch of all the channel ports are higher than the second preset voltage VH, the second output terminal outputs a second control signal. A first electrode of the first current source is coupled to the feedback output terminal, and a second electrode of the first current source is coupled to a first voltage terminal. The first current source is configured to receive the first control signal, and the feedback output terminal provides the first current I1. A first electrode of the second current source is coupled to a second voltage terminal, and a second electrode of the second current source is coupled to the feedback output terminal. The second current source is configured to receive the second control signal, and the feedback output terminal provides the second current I2. The first voltage terminal is configured to output a first voltage V1, and the second voltage terminal is configured to output a second voltage V2, where |V1|<|V2|. The feedback output terminal of the driver circuit can provide the first current I1 (that is, a sink current), and can also provide the second current I2 (that is, a source current). Technical effects are the same as those described above, and details are not described herein again.

BRIEF DESCRIPTION OF DRAWINGS

FIG. 2b is a schematic diagram of a correspondence between sub-pixels and the light string groups shown in FIG. 2a;

FIG. 4b is a schematic diagram of voltage values of the channel ports shown in FIG. 3a;

Reference signs in the accompanying drawings:

01: display terminal; 10: liquid crystal display panel; 100: cell alignment substrate; 101: array substrate; 102: liquid crystal layer; 20: backlight unit; 201: reflector; 202: light emitting device; 203: optical film; 02: middle frame; 21: light string group; 200: light string; 120: sub-pixel; 30: backlight control circuit; 301: driver circuit; 302: power conversion circuit; 323: light emitting control current source; 311: comparator; 321: first current source; 322: second current source

DESCRIPTION OF EMBODIMENTS

The following describes the technical solutions in the embodiments of this application with reference to the accompanying drawings in the embodiments of this application. It is clearly that the described embodiments are merely a part rather than all of the embodiments of this application.

The following terms "first" and "second" are merely intended for description, and shall not be understood as an indication or implication of relative importance or implicit indication of the number of indicated technical features. Therefore, a feature limited by "first" or "second" may explicitly or implicitly include one or more features. In the description of this application, unless otherwise stated, "a plurality of" means two or more than two.

In addition, in this application, orientation terms such as "top", "bottom", "left", and "right" may include but are not limited to orientations defined relative to orientations in which components in the accompanying drawings are schematically placed. It should be understood that these orientation terms may be relative concepts, are used for description and clarification of "relative to", and may vary according to a change in the orientations in which the components in the accompanying drawings are placed.

In this application, a term "coupling" may be a manner of implementing an electrical connection for signal transmission. Unless otherwise clearly specified and limited, "coupling" may be a direct electrical connection, or may be an indirect electrical connection through an intermediate medium.

An embodiment of this application provides a display terminal. The display terminal includes, for example, a television, a mobile phone, a tablet computer, a personal digital assistant (personal digital assistant, PDA), or a vehicle-mounted computer. A specific form of the display terminal is not specially limited in this embodiment of this application. The display terminal in any one of the foregoing forms includes an LCD. In this case, as shown in FIG. 1, the display terminal 01 includes a liquid crystal display panel 10 and a backlight unit (backlight unit, BLU) 20.

Figure 1:
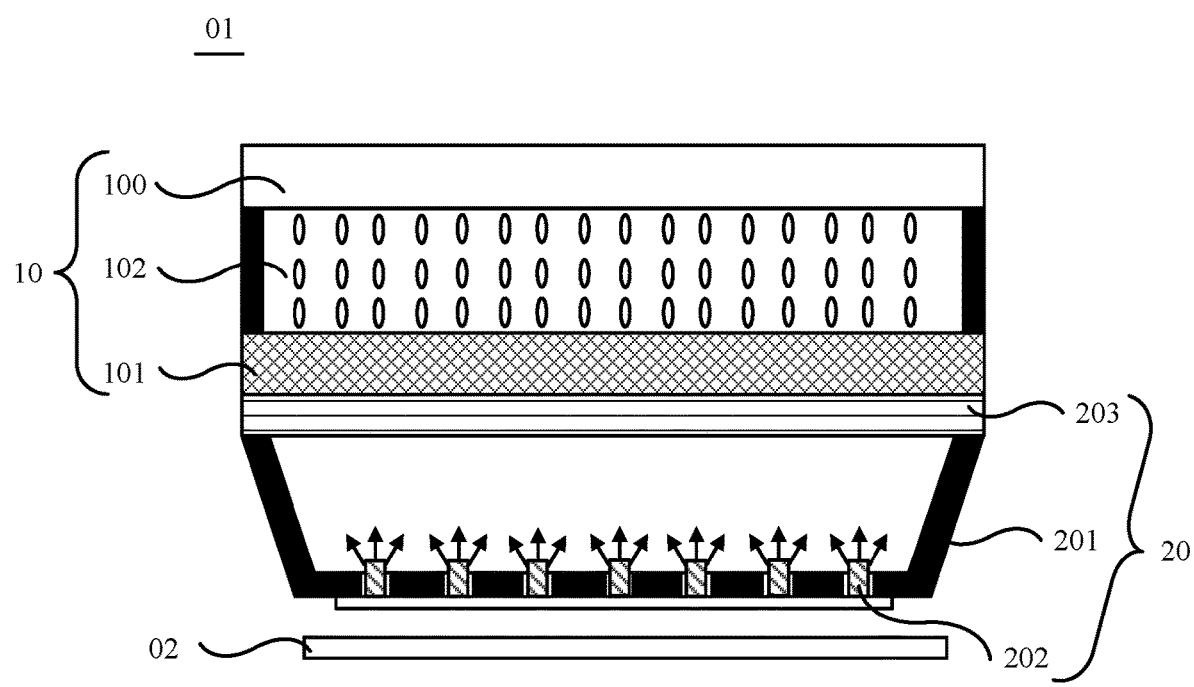
FIG. 1 is a schematic structural diagram of a display terminal according to an embodiment of this application.

As shown in FIG. 1, the liquid crystal display panel 10 includes a cell alignment substrate 100 and an array substrate 101 that are disposed oppositely. Cell alignment is performed on the cell alignment substrate 100 and the array substrate 101 to form a liquid crystal cell. The liquid crystal display panel 10 further includes a liquid crystal layer 102 filled between the cell alignment substrate 100 and the array substrate 101. A light transmittance obtained after light emitted by the backlight unit 20 passes through the liquid crystal display panel 10 is controlled. In this way, a gray scale of the liquid crystal display panel 10 is controlled.

As shown in FIG. 1, the backlight unit 20 includes a reflector 201, a plurality of light emitting devices 202 that are disposed on the reflector 201, and a plurality of layers of optical films 203 located on light emitting sides of the light emitting devices 202. The optical module 203 may be a diffuser film, a prism film, or the like.

The light emitting device 202 may be a light emitting diode (light emitting diode, LED). Based on this, the plurality of light emitting devices 202 may be connected in series to form a light string 200 shown in FIG. 2a. A plurality of light strings 200 may be connected in parallel to form a light string group 21. One light string group 21 may be used as a backlight control region capable of independent brightness control, thereby implementing local dimming (local dimming) of the backlight unit 20 and enhancing image contrast.

Figure 2A:
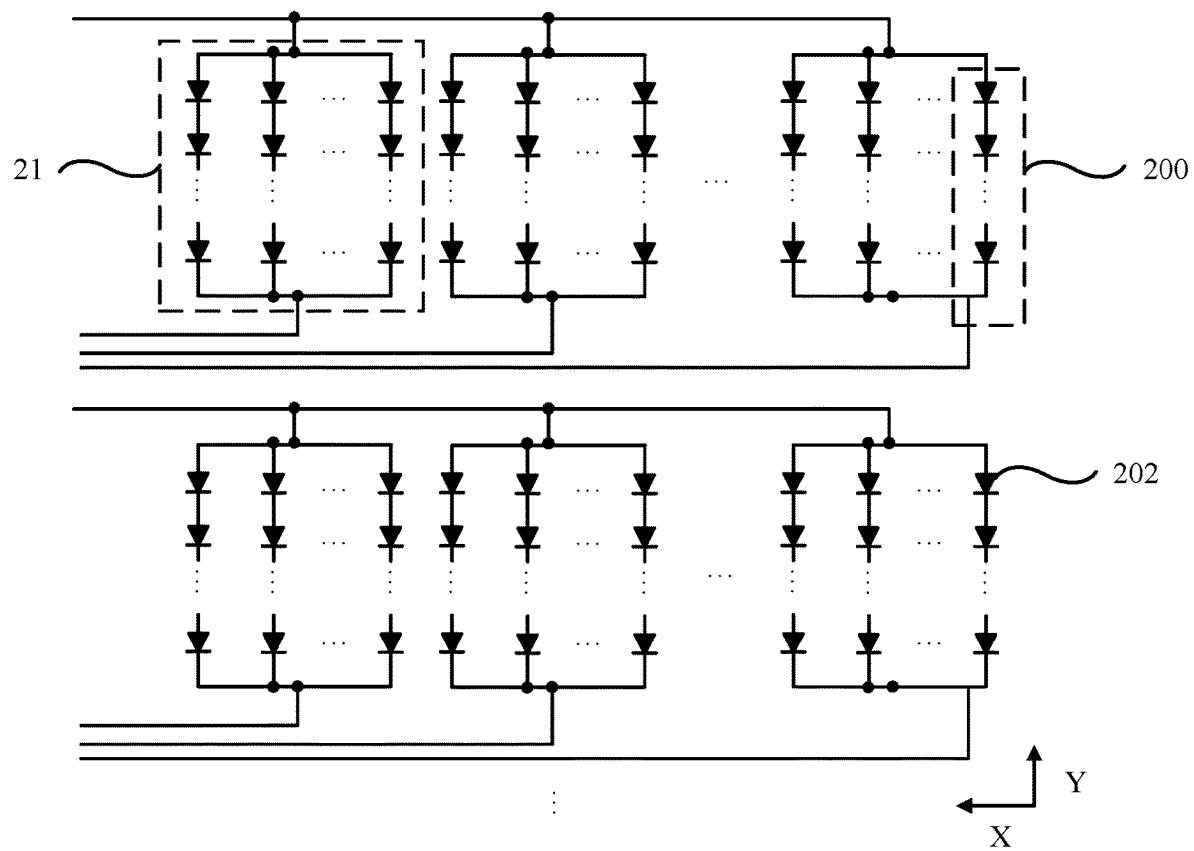
FIG. 2a is a schematic structural diagram of a plurality of light string groups according to an embodiment of this application.
Figure 2B:
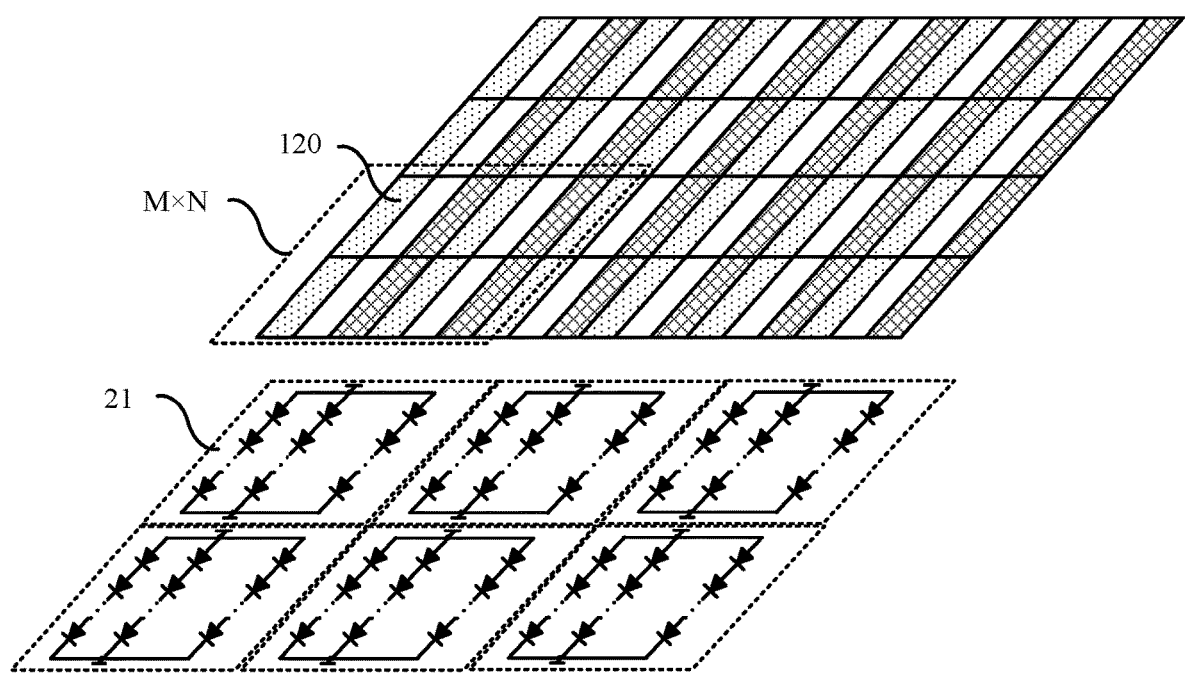

In some embodiments of this application, as shown in FIG. 2b, a plurality of sub-pixels 120 in the liquid crystal display panel 10 are arranged in an array. A plurality of light string groups 21 in the backlight unit 20 are also arranged in an array. Based on this, a vertical projection, on the backlight unit 20, of a region in which M×N sub-pixels 120 are located overlaps a region in which one light string group 21 is located. That is, when luminosity of one light string group 21 is controlled, display brightness of the region in which the M×N sub-pixels 120 are located can be controlled.

In the M×N sub-pixels, M≥1, N≥1, and N and M are positive integers. Smaller values of M and N indicate higher precision in local dimming of the backlight unit 20, and a more complex control process. On the contrary, larger values of M and N indicate lower precision in local dimming of the backlight unit 20, and a simpler control process. Specific values of M and N are not limited in this application.

It should be noted that, for ease of description in the following, in the plurality of light string groups 21 that are arranged in an array and that are shown in FIG. 2*a*, a row of light string groups 21 arranged along an X direction are referred to as light string groups 21 in a same row, and a column of light string groups 21 arranged along a Y direction are referred to as light string groups 21 in a same column.

Figure 3A:
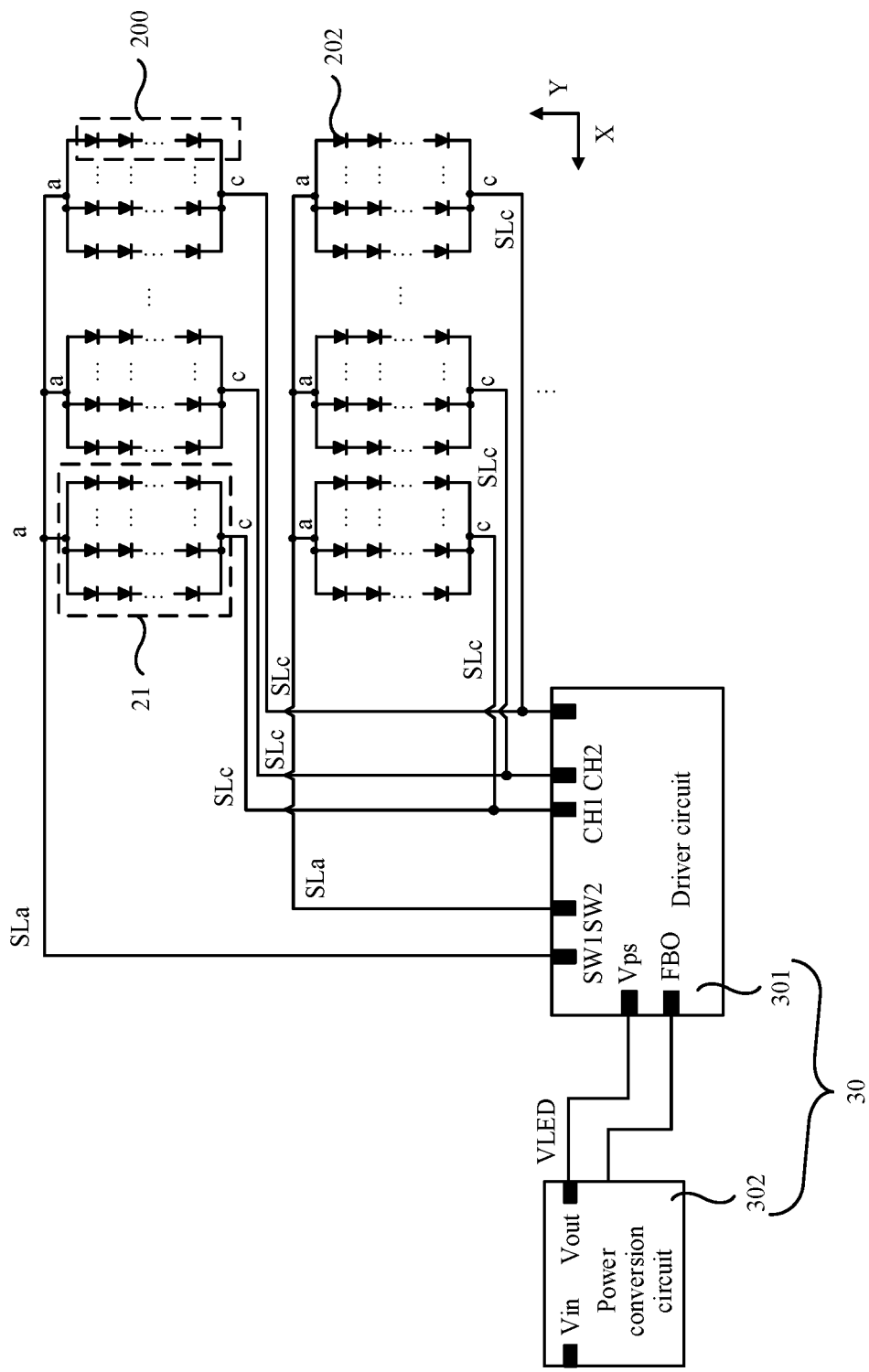
FIG. 3a is a schematic diagram of a connection relationship between a backlight control circuit and a plurality of light string groups according to an embodiment of this application.

To control the plurality of light string groups 21, the display terminal 01 provided in this embodiment of this application further includes a backlight control circuit 30 shown in FIG. 3*a*. The backlight control circuit 30 includes a driver circuit 301 and a power conversion circuit 302. The backlight control circuit 30 may be disposed on a middle frame 02 (as shown in FIG. 1) on a side that is of the backlight unit 20 and that is away from the liquid crystal display panel 10. A mainboard of the display terminal 01 is further disposed on a side that is of the middle frame 02 and that faces away from the liquid crystal display panel 10. In some embodiments of this application, the backlight control circuit 30 may be integrated in the mainboard. Alternatively, in some other embodiments, the backlight control circuit 30 and the mainboard may be disposed independently on the middle frame 02. Alternatively, in some other embodiments, the backlight control circuit 30 may be integrated inside the backlight unit 20.

In addition, the driver circuit 301 may be a driver IC (integrated circuit, IC). The power conversion circuit 302 may be a direct current (direct current, DC)-to-direct current, that is, DC/DC direct current power supply chip. An input terminal Vin (as shown in FIG. 3*a*) of the DC/DC direct current power supply chip is configured to receive an input voltage and convert the input voltage into an output voltage.

For example, a battery voltage of the display terminal 01 or an output of another power supply circuit may be used as an input of the DC/DC direct current power supply chip. In addition, for the input of the DC/DC direct current power supply chip, load power consumption of the light string group 21 as a load needs to be considered, and the input of the DC/DC direct current power supply chip also needs to meet a transient performance requirement of the light string group 21. In this case, when an input voltage received by the power conversion circuit 302 has a comparatively small amplitude, the power conversion circuit 302 may be used as a step-up circuit to perform voltage step-up processing on the input voltage. Therefore, a supply voltage VLED that enables each light string 200 in the light string group 21 to emit light normally can be output from a voltage output terminal Vout of the power conversion circuit 302.

Alternatively, when an input voltage has a comparatively large amplitude, the power conversion circuit 302 may be used as a step-down circuit to perform voltage step-down processing on the input voltage, so that the supply voltage VLED is output from the voltage output terminal Vout of the power conversion circuit 302.

For example, one light emitting device 202 in the light string 200 requires a voltage of about 3 V when the light emitting device 202 emits light normally. When 10 light emitting devices 202 are connected in series in the light string 200, a supply voltage VLED required by a second terminal a of the light string 200 is 30 V. In this case, the power conversion circuit 302 may convert an input voltage received by the input terminal Vin into a supply voltage of 30 V.

In addition, as shown in FIG. 3*a*, the driver circuit 301 includes a feedback output terminal (feedback output, FBO) and at least one channel port (for example, CH1, CH2, and . . . in FIG. 3*a*). One channel port is coupled to a first terminal c of at least one light string group 21 (that is, a cathode of each light string 200 in the light string group 21).

Figure 3B:
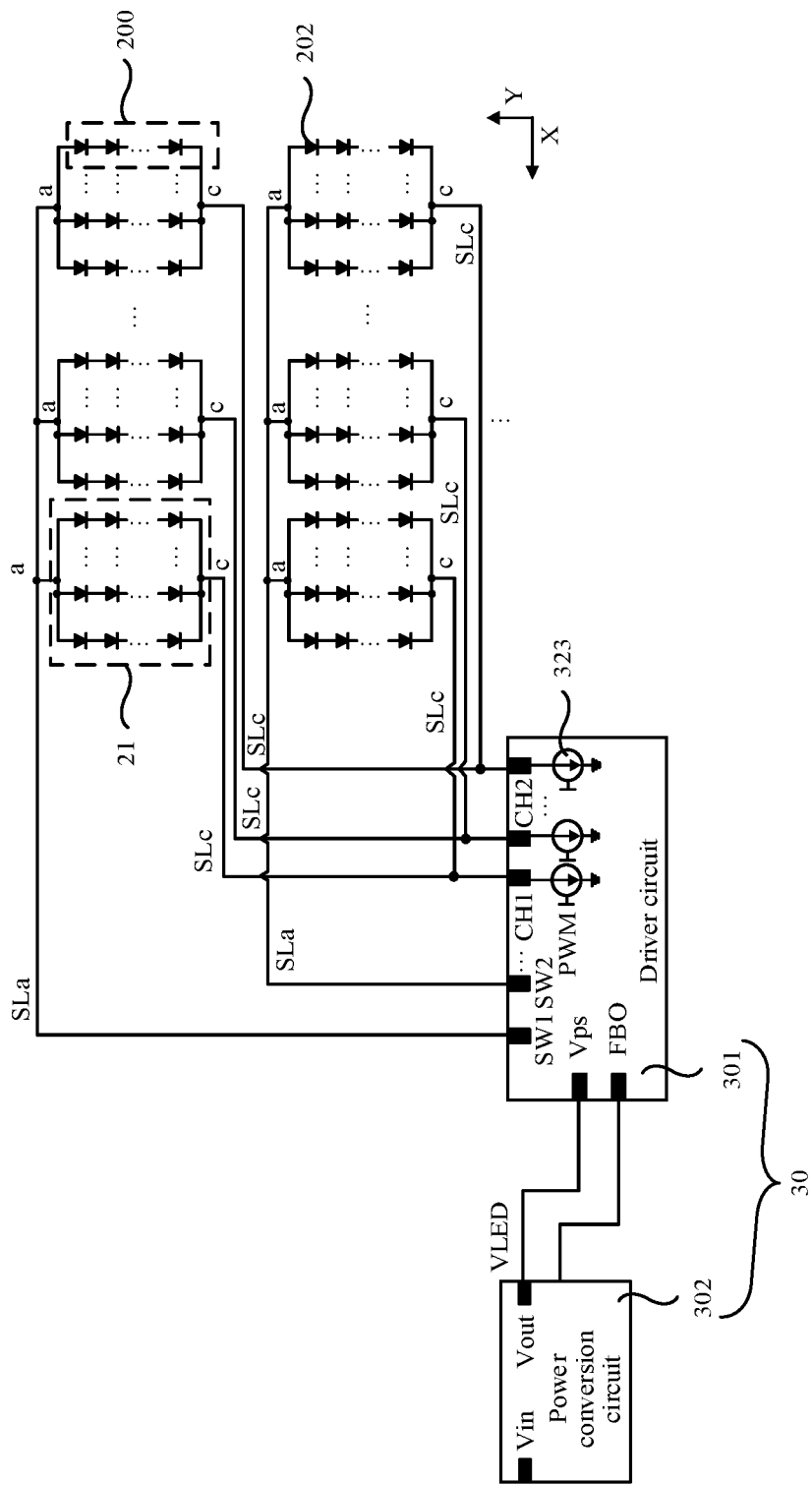
FIG. 3b is a schematic diagram of another connection relationship between a backlight control circuit and a plurality of light string groups according to an embodiment of this application.

In this case, light emitting control current sources 323 that are shown in FIG. 3*b* and that are coupled to the channel ports (for example, CH1, CH2, and . . . in FIG. 3*a*) respectively may be disposed inside the driver circuit 301. The light emitting control current source 323 may provide a constant source current for the channel port CH coupled to the light emitting control current source 323. The source current is transferred, through the channel port CH, to the light strings 200 connected in parallel in the light string group 21 to which the channel port is coupled, so that each light string 200 in the light string group 21 can be driven to emit light.

It should be noted that a rated current flowing through the light string group 21 matches a cut-in voltage or knee voltage (knee voltage) of the channel port CH. When a voltage of the channel port CH of the driver circuit 301 is lower than the cut-in voltage, the light emitting control current source 323 coupled to the channel port CH cannot provide the rated current for the light string group 21, and the light string group 21 cannot emit light normally. Therefore, to enable the light string group 21 to have normal luminosity, the voltage of the channel port CH needs to be higher than the cut-in voltage of the channel port CH.

Based on this, a pulse width modulation (pulse width modulation, PWM) signal whose duty cycle is adjustable can be used to adjust luminosity of each light string 200. Based on a luminosity requirement, the duty cycle of the PWM signal is adjusted. In this way, effective duration of the source current provided by the light emitting control current source 323 for the light string group 21 within a specific time can be controlled, and therefore luminosity of the light string group 21 is controlled.

In this way, one channel port of the driver circuit 301 may be coupled to at least one light string group 21, so that each light string 200 does not need to be coupled to one channel port. It can be learned from the foregoing that the region in which the light string group 21 is located may correspond to the region in which the M×N sub-pixels 120 are located on the liquid crystal display panel 10. Therefore, local dimming can be performed on an image displayed by the display terminal 01. It may be understood that each light string 200 may be alternatively coupled to one channel port. In this case, more channel ports need to be provided in the driver circuit 301.

In addition, as shown in FIG. 3*a*, the power conversion circuit 302 in the backlight control circuit 30 may be coupled to the feedback output terminal FBO of the driver circuit 301. The power conversion circuit 302 includes the voltage output terminal Vout. The voltage output terminal Vout is configured to provide the supply voltage VLED for the second terminal a of each light string group 21 (that is, an anode of each light string 200 in the light string group 21).

In some embodiments of this application, when the backlight unit 20 further includes a plurality of first signal lines SLc shown in FIG. 3*a*, a manner of connecting the channel ports (CH1, CH2, and . . . ) to the light string groups 21 may be as follows: One first signal line SLc is separately coupled to the first terminals c of the light string groups 21 in the same column (Y direction) and one channel port CH of the driver circuit 301.

In addition, the backlight unit 20 further includes a plurality of second signal lines SLa shown in FIG. 3a. The driver circuit 301 further includes a plurality of gating ports (SW1, SW2, and . . . ) and a power supply port Vps coupled to each gating port (SW1, SW2, and . . . ). The power supply port Vps is also coupled to the voltage output terminal Vout of the power conversion circuit 302, so that the voltage output terminal Vout of the power conversion circuit 302 can transfer the supply voltage VLED to the power supply port Vps of the driver circuit 301.

Based on this, a manner in which the power conversion circuit 302 provides the supply voltage VLED for the second terminals a of the light string groups 21 may be as follows: As shown in FIG. 3a, one second signal line SLa is separately coupled to one gating port SW1 and the second terminals a of the plurality of light string groups 21 in the same row (X direction).

In this way, the power supply port Vps of the driver circuit 301 can provide the supply voltage VLED for the gating ports (SW1, SW2, and . . . ) one by one. In addition, the plurality of first signal lines SLc may separately transfer voltages of the first terminals c of the light string groups 21 in the same row (X direction) to the channel ports (CH1, CH2, and . . . ) row by row. In this case, the driver circuit 301 may be configured to obtain voltages (Vch1, Vch2, and . . . ) of the channel ports (CH1, CH2, and . . . ), and generate a current feedback signal based on values of the voltages (Vch1, Vch2, and . . . ). The current feedback signal may be provided by the feedback output terminal FBO of the driver circuit 301 for the power conversion circuit 302.

Figure 3C:
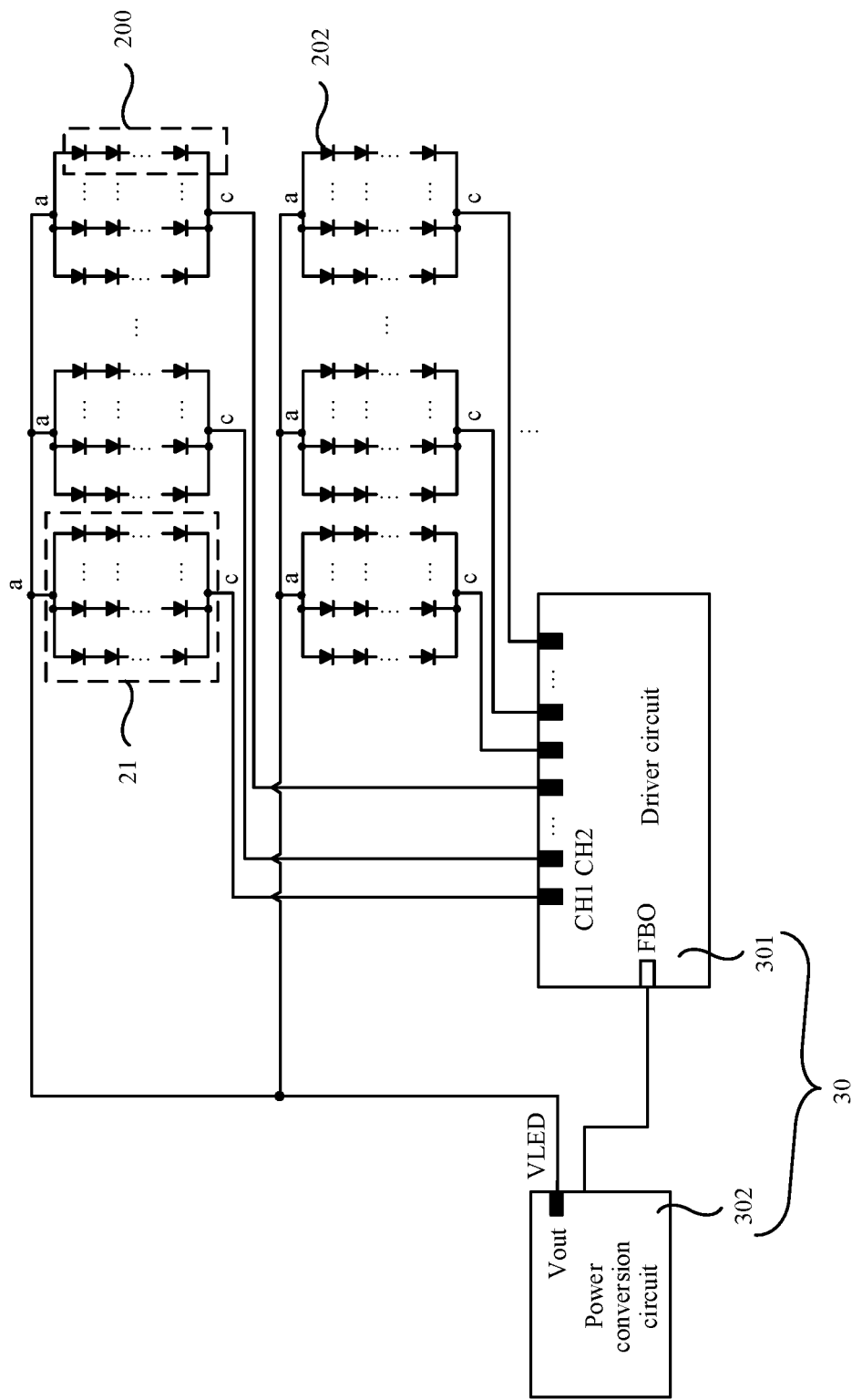
FIG. 3c is a schematic diagram of another connection relationship between a backlight control circuit and a plurality of light string groups according to an embodiment of this application.

Alternatively, in some other embodiments of this application, as shown in FIG. 3c, a manner of connecting the channel ports (CH1, CH2, and . . . ) to the light string groups 21 may be that one first signal line SLc is coupled to the first terminal c of one light string group 21. In this case, compared with a structure shown in FIG. 3c, in FIG. 3a, one channel port CH can be separately coupled to the first terminals c of the light string groups 21 in the same column (Y direction), thereby reducing a quantity of channel ports CH in the driver circuit 301.

In addition, when the manner of connecting the channel ports (CH1, CH2, and . . . ) of the driver circuit 301 to the light string groups 21 is the connection manner shown in FIG. 3c, the voltage output terminal Vout of the power conversion circuit 302 may be directly coupled to the second terminals a of the light string groups 21 in each row. In this case, after the voltage output terminal Vout of the power conversion circuit 302 outputs the supply voltage VLED, the driver circuit 301 may directly obtain the voltages (Vch1, Vch2, and . . . ) of the channel ports (CH1, CH2, and . . . ), and the feedback output terminal FBO provides the current feedback signal.

For ease of description, the following describes the backlight control circuit 30 by using a structure shown in FIG. 3a as an example.

Figure 4A:
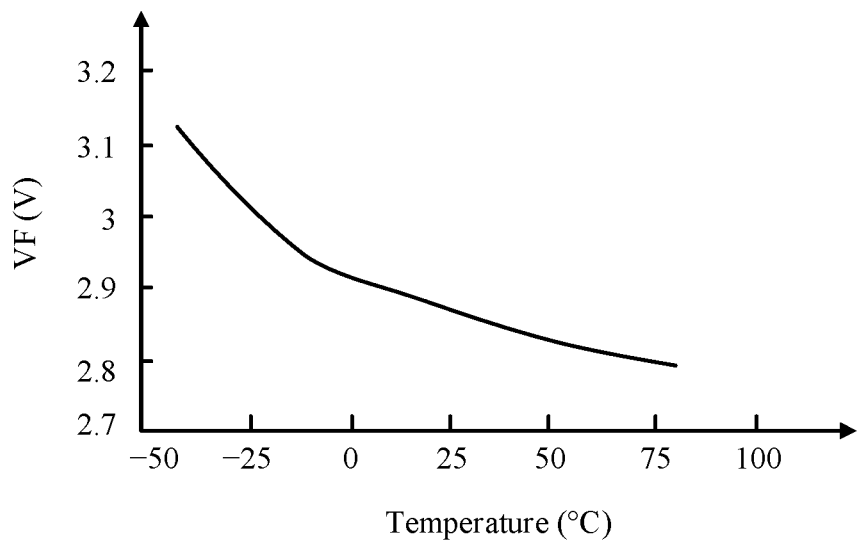
FIG. 4a is a schematic diagram of a relationship between a temperature and a forward voltage of a light string according to an embodiment of this application.

In addition, a forward voltage VF of a light string 200 in each light string group 21 decreases as a temperature of the light string 200 increases, as shown in FIG. 4a, where FIG. 4a is a curve change diagram of the forward voltage VF of the light string 200 against the temperature of the light string 200 when a rated operating current IF of the light string 200 is 3 mA.

Figure 4B:
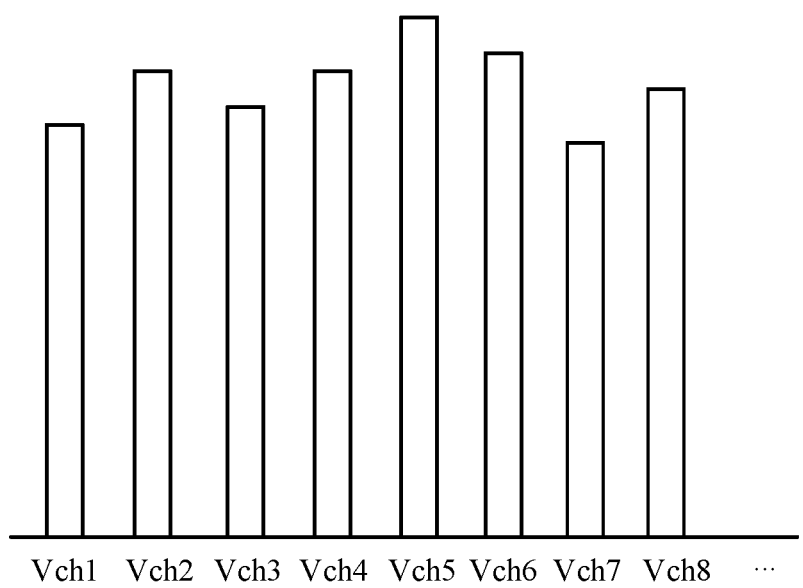

Because brightness at different places in an image displayed by the display terminal 01 is different, temperatures of the light string groups 21 in different positions are also different. As a result, the voltages (Vch1, Vch2, and . . . ) of the channel ports (CH1, CH2, and . . . ) of the driver circuit 301 are inconsistent, as shown in FIG. 4b, where a larger height of a bar in a bar graph shown in FIG. 4b indicates a larger voltage value of a corresponding channel port.

Based on this, it can be learned from the foregoing that the power conversion circuit 302 is coupled to the feedback output terminal FBO of the driver circuit 301. Therefore, after performing voltage conversion on the input voltage, the power conversion circuit 302 may be further configured to: based on the current feedback signal provided by the feedback output terminal FBO of the driver circuit 301, perform fine adjustment on a voltage obtained after conversion, to obtain the supply voltage VLED, and output the supply voltage VLED through the voltage output terminal Vout. In this way, the voltages of the second terminals a of the light string groups 21 are adjusted.

In this case, after the voltages of the second terminals a of the light string groups 21 are adjusted, because the source current flowing through the light string groups 21 is fixed, the voltages of the second terminals a of the light string groups 21, that is, the voltages (Vch1, Vch2, and . . . ) of the channel ports (CH1, CH2, and . . . ) of the driver circuit 301 change with the voltages of the second terminals a of the light string groups 21. In this way, the voltages of the first terminals c of the light string groups 21 are higher than the cut-in voltage of the channel ports CH of the driver circuit 301, thereby ensuring that the light string groups 21 can have normal luminosity. In addition, the voltages Vch of the channel ports of the driver circuit 301 can be kept within a specific range. This ensures normal luminosity of the light string groups 21, and reduces power consumption of the driver circuit.

The forward voltage VF of the light string group 21 is a voltage difference between a voltage Va of the second terminal of the light string group 21 and a voltage Vc of the first terminal of the light string group 21, that is, VF=Va−Vc=VLED−Vch. Therefore, for example, when the forward voltage VF of the light string group 21 decreases and causes the voltage Vch of the channel port CH that is of the driver circuit 301 and that is coupled to the first terminal c of the light string group 21 to increase, the driver circuit 301 provides one type of current feedback signal for the power conversion circuit 302.

In this case, the power conversion circuit 302 may reduce, based on the current feedback signal, the supply voltage VLED output by the voltage output terminal Vout of the power conversion circuit 302. Because magnitude of the source current provided by the light emitting control current source 323 for the light string group 21 is fixed, the voltage of the second terminal a of the light string group 21, that is, the voltage Vch of the channel port CH that is of the driver circuit 301 and that is coupled to the second terminal a of the light string group 21, decreases accordingly.

Alternatively for another example, when the forward voltage VF of the light string group 21 increases and causes the voltage Vch of the channel port CH that is of the driver circuit 301 and that is coupled to the first terminal c of the light string group 21 to decrease, the driver circuit 301 provides another type of current feedback signal for the power conversion circuit 302.

In this case, the power conversion circuit 302 may increase, based on the current feedback signal, the supply voltage VLED output by the voltage output terminal Vout of the power conversion circuit 302. Because the magnitude of the source current provided by the light emitting control current source 323 for the light string group 21 is fixed, the voltage of the second terminal a of the light string group 21, that is, the voltage Vch of the channel port CH that is of the driver circuit 301 and that is coupled to the second terminal a of the light string group 21, increases accordingly.

In conclusion, on the one hand, in the backlight control circuit 30 provided in this embodiment of this application, the feedback output terminal FBO that can provide the current feedback signal is disposed in the driver circuit 301, and the feedback output terminal FBO is coupled to the power conversion circuit 302. This can enable the driver circuit 301 to provide the current feedback signal for the power conversion circuit 302 based on the voltages (Vch1, Vch2, and . . . ) of the channel ports (CH1, CH2, and . . . ) of the driver circuit 301 in real time. Based on this, the power conversion circuit 302 can perform, in real time based on the current feedback signal, bidirectional adjustment on the supply voltage VLED output by the voltage output terminal Vout of the power conversion circuit 302.

In this way, in a process of displaying by the display terminal 01, the supply voltage VLED received by the second terminal of the light string group 21 can be adjusted within a specific range (for example, about 300 mV). This avoids abnormal luminosity of the light string group 21 caused by the voltage Vch of the channel port CH being lower than the cut-in voltage of the channel port CH, or avoids an increase in power consumption of the driver circuit caused by an excessively high voltage Vch of the channel port CH. In addition, this can also avoid that the voltages (Vch1, Vch2, and . . . ) of the channel ports (CH1, CH2, and . . . ) of the driver circuit 301 remain in a comparatively high or low state for a long time, reduce a difference between the voltages (Vch1, Vch2, and . . . ) of the channel ports (CH1, CH2, and . . . ) of the driver circuit 301, and thus finally reduce power consumption of the driver circuit 301.

On the other hand, a feedback signal provided by the feedback output terminal FBO that is of the driver circuit 301 and that is coupled to the power conversion circuit 302 is a current feedback signal. Compared with a voltage signal, the current signal is not affected by a distance between the driver circuit 301 and the power conversion circuit 302, and therefore no comparatively large fluctuation is produced, so that signal interference caused by cabling noise can be reduced.

Figure 5:
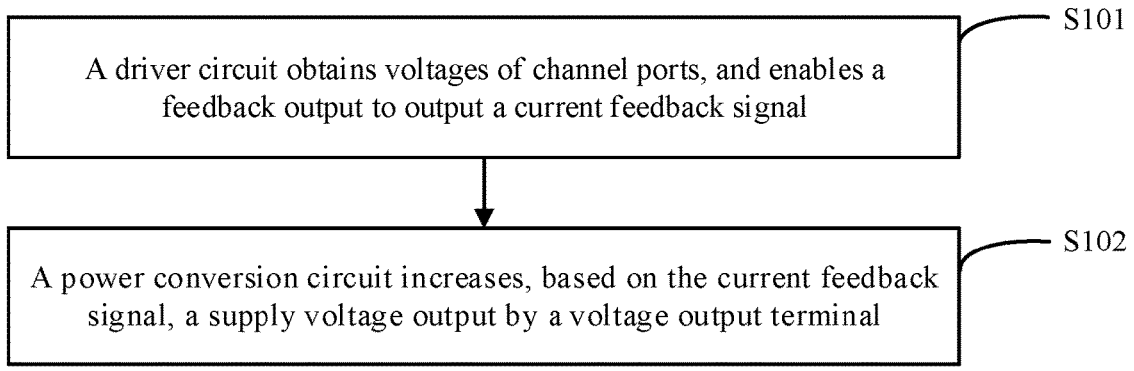
FIG. 5 is a flowchart of a control method of a backlight control circuit according to an embodiment of this application.

Based on the structure of the backlight control circuit 30, an embodiment of this application provides a control method of a backlight control circuit. As shown in FIG. 5, the method includes S101 and S102.

S101: The driver circuit 301 obtains voltages (Vch1, Vch2, and . . . ) of the channel ports (CH1, CH2, and . . . ), and enables the feedback output terminal FBO to provide a current feedback signal.

Figure 6:
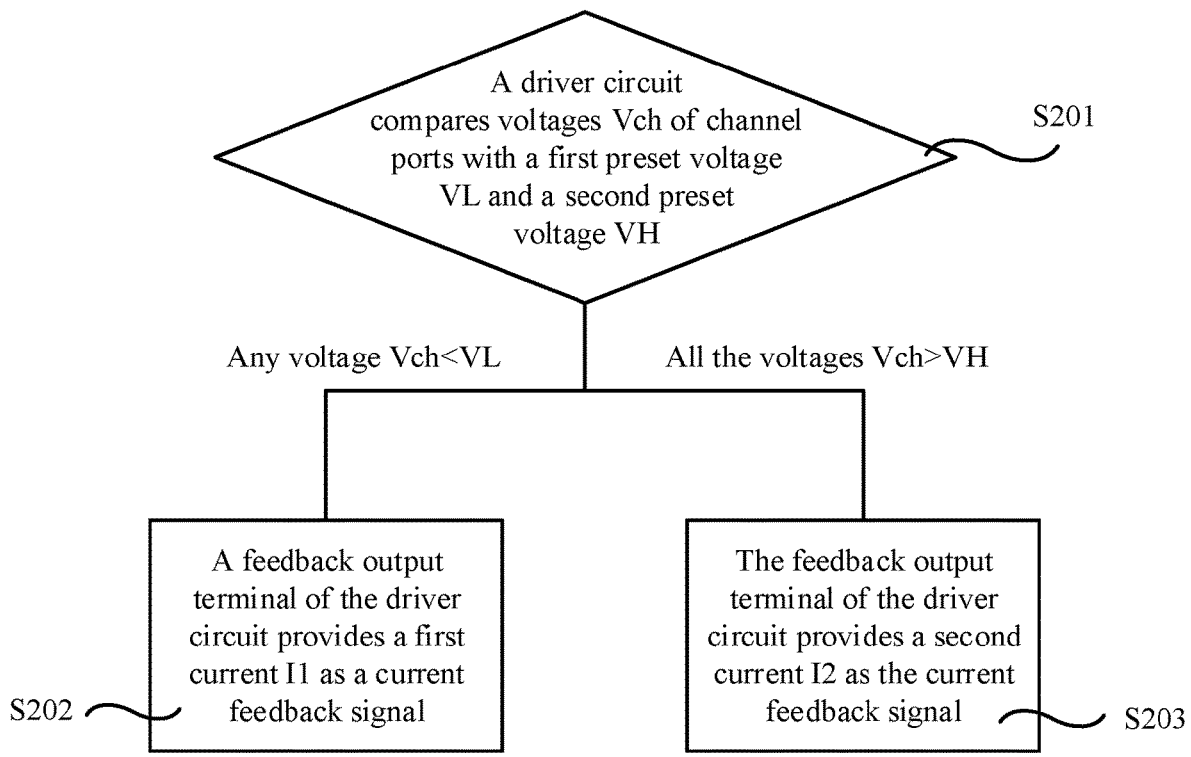
FIG. 6 is a flowchart of specific steps of S101 in FIG. 5.

It can be learned from the foregoing that the driver circuit 301 is configured to perform S101. S101 specifically includes S201 to S203 shown in FIG. 6.

S201: The driver circuit 301 compares the voltages (Vch1, Vch2, and . . . ) of the channel ports (CH1, CH2, and . . . ) with a first preset voltage VL and a second preset voltage VH, where VL<VH.

It should be noted that, when the voltage Vch of the channel port is within a range of VL to VH, an impact on power consumption of the driver circuit 301 is comparatively small and can be ignored. When the voltage Vch of the channel port is not within the range of VL to VH, for example, when the voltage Vch of the channel port is lower than the first preset voltage VL, the voltage Vch of the channel port CH is prone to be lower than a cut-in voltage of the channel port CH. As a result, luminosity of the light string group 21 is abnormal. Alternatively, when the voltage Vch of the channel port is higher than the second preset voltage VH, the voltage Vch of the channel port has a comparatively great impact on power consumption of the driver circuit 301. In this case, the feedback output terminal FBO of the driver circuit 301 needs to provide the current feedback signal for the power conversion circuit 302, so that the power conversion circuit 302 can perform, in real time based on the current feedback signal, bidirectional adjustment on a supply voltage VLED output by the voltage output terminal Vout of the power conversion circuit 302, and finally adjust the voltage of the channel port CH to be within the range of VL to VH. Values of the first preset voltage VL and the second preset voltage VH are not limited in this application, and may be set based on performance of the driver circuit 301 and power consumption that can be tolerated by the driver circuit 301.

Figure 7:
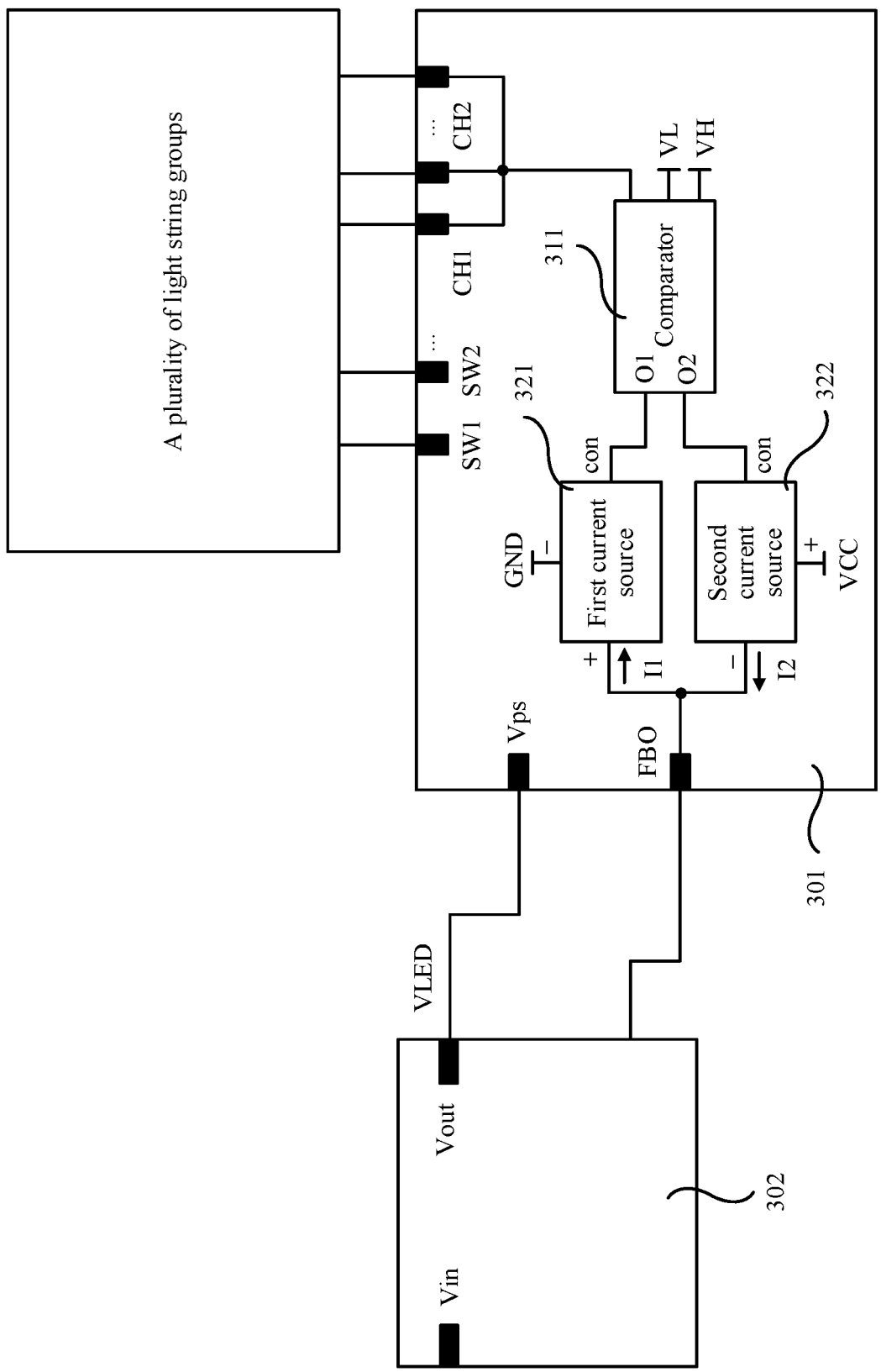
FIG. 7 is a schematic diagram of one connection between a driver circuit, a power conversion circuit, and a plurality of light string groups according to an embodiment of this application.

To be able to perform S201, the driver circuit 301 may include a comparator 311, as shown in FIG. 7. An input terminal of the comparator 311 is coupled to each channel port CH. In addition, the comparator 311 further includes two reference voltage input terminals that are configured to input the first preset voltage VL and the second preset voltage VH into the comparator 311 respectively.

It should be noted that, when the comparator 311 is coupled to a plurality of channel ports CH, for example, the comparator 311 may be separately connected to each channel port, and compare the voltage Vch of each channel port with the first preset voltage VL and the second preset voltage VH. A manner in which the comparator 311 compares the voltages of the plurality of channel ports CH coupled to the comparator 311 is not limited in this application.

In this way, the comparator 311 may compare the voltages (Vch1, Vch2, and . . . ) of the channel ports (CH1, CH2, and . . . ) with the first preset voltage VL and the second preset voltage VH. In addition, the comparator 311 further includes a first output terminal O1 and a second output terminal O2.

When a comparison result of the comparator 311 is that the voltage Vch of any channel port CH is lower than the first preset voltage VL, that is, when any voltage Vch is lower than VL, the first output terminal O1 of the comparator 311 outputs a valid signal. This ensures stability of currents transferred by all the channel ports of the driver circuit 301 to the light string groups 21, so that light emitting performance of the light string groups 21 is stable, and therefore the light string groups 21 can emit light normally.

Alternatively, when a comparison result of the comparator 311 is that the voltages Vch of all the channel ports CH are higher than the second preset voltage VH, that is, when all the voltages Vch are higher than VH, the second output terminal O2 of the comparator 311 outputs a valid signal, to reduce power consumption of the driver circuit 301.

S202: When the voltage Vch of any channel port CH is lower than the first preset voltage VL, the feedback output terminal FBO of the driver circuit 301 provides a first current I1 as the current feedback signal.

It should be noted that, it can be learned from the foregoing that the driver circuit 301 enables the feedback output terminal FBO of the driver circuit 301 to provide the current feedback signal based on the voltages (Vch1, Vch2, and . . . ) of all the channel ports. In this case, in some embodiments, when the driver circuit 301 performs S202, the comparator 311 of the driver circuit 301 may obtain the voltages Vch of all the channel ports, and then determine whether the voltage Vch of each channel port is lower than the first preset voltage VL. Then, based on determining results for the voltages Vch of all the channel ports, the comparator 311 determines whether the voltage Vch of any channel port CH in the voltages Vch of all the channel ports is lower than the first preset voltage VL.

Alternatively, in some other embodiments, when the driver circuit 301 performs S202, the comparator 311 of the driver circuit 301 may sequentially determine, according to physical disposing positions of the channel ports CH, whether the voltages Vch of the channel ports are lower than the first preset voltage VL. When the voltage Vch of one channel port is lower than the first preset voltage VL, it is considered that the voltage Vch of any channel port CH is lower than the first preset voltage VL. A manner in which the driver circuit 301 determines that the voltage Vch of any channel port CH is lower than the first preset voltage VL is not limited in this application.

To be able to perform S202, the driver circuit 301 may include a first current source 321, as shown in FIG. 7. The first current source 321 is configured to perform S202.

For example, as shown in FIG. 7, a control terminal (Con) of the first current source 321 is coupled to the first output terminal O1 of the comparator 311. A first electrode (for example, a positive electrode "+") of the first current source 321 is coupled to the feedback output terminal FBO of the driver circuit 301, a second electrode (for example, a negative electrode "−") of the first current source 321 is coupled to a first voltage terminal, and the first voltage terminal is configured to output a first voltage V1. For example, in some embodiments of this application, the first voltage terminal may be the ground terminal GND, and the first voltage V1 is 0 V or a low level.

The positive electrode "+" of the first current source 321 is coupled to the feedback output terminal FBO of the driver circuit 301, and the negative electrode "−" of the first current source 321 is coupled to the ground terminal GND. Therefore, the first current I1 generated by the first current source 321 may be a sink current (sink) flowing to the driver circuit 301.

Based on this, when the comparison result of the comparator 311 is that the voltage Vch of any channel port CH is lower than the first preset voltage VL, the first output terminal O1 of the comparator 311 outputs a valid signal as a first control signal. When receiving the first control signal, the control terminal (Con) of the first current source 321 starts to work, and generates the first current I1 that is used as the current feedback signal provided by the feedback output terminal FBO of the driver circuit 301.

It should be noted that, in this embodiment of this application, the comparator 311 of the driver circuit 301 may detect the voltages Vch of the channel ports CH for every frame, and a user may set a reporting time for a detection result of the comparator 311 as required. For example, the detection result may be reported once for every frame or every two frames, where one frame may be calculated according to a refresh rate of the liquid crystal display panel 10. For example, when the refresh rate of the liquid crystal display panel 10 is 60 Hz, duration T of one frame is 1/60 Hz.

After the comparator 311 of the driver circuit 301 reports a detection result each time (for example, one time may be two frames), when the driver circuit 301 obtains, based on the detection result reported by the comparator 311, that the voltage Vch of any channel port is lower than the first preset voltage VL for S consecutive times (for example, S times are S×2 frames, where S≥2, and S is a positive integer), the first current I1 provided by the feedback output terminal FBO of the driver circuit 301 may increase by a current variation ΔI in a step manner each time.

It should be noted that, that the first current I1 provided by the feedback output terminal FBO of the driver circuit 301 increases by a current variation ΔI in a step manner each time means that a current value of the first current I1 provided by the feedback output terminal FBO of the driver circuit 301 each time increases by the current variation ΔI on a basis of a current value of the first current I1 provided last time.

Then, S102 shown in FIG. 5 is performed.

S102: The power conversion circuit 302 increases, based on the current feedback signal, the supply voltage VLED output by the voltage output terminal Vout.

It can be learned from the foregoing that, when the voltage Vch of any channel port CH is lower than the first preset voltage VL, the feedback output terminal FBO of the driver circuit 301 provides the first current I1 as the current feedback signal. In a loop that includes the plurality of light string groups 21, the power conversion circuit 302, and the driver circuit 301, the first current I1 is the sink current flowing to the driver circuit 301. Therefore, according to a characteristic of a current flowing from a high electric potential to a low electric potential, the supply voltage VLED output by the voltage output terminal Vout of the power conversion circuit 302 increases on a basis of an original voltage.

Based on this, when the voltage Vch of any channel port is lower than the first preset voltage VL for S consecutive times (for example, S times are S×2 frames, where S≥2, and S is a positive integer), the first current I1 provided by the feedback output terminal FBO of the driver circuit 301 increases by the current variation ΔI in the step manner each time. In this case, in the loop that includes the plurality of light string groups 21, the power conversion circuit 302, and the driver circuit 301, the first current I1 is the sink current flowing to the driver circuit 301. Therefore, according to the characteristic of a current flowing from a high electric potential to a low electric potential, the power conversion circuit 302 increases, by a voltage variation ΔV based on the first current I1 each time, the voltage output by the voltage output terminal Vout, that is, the supply voltage VLED.

In this way, when the voltage Vch of any channel port is lower than the first preset voltage VL for S consecutive times, the power conversion circuit 302 increases, by the same voltage variation ΔV based on the first current I1 each time, the supply voltage VLED output by the voltage output terminal Vout, so that the supply voltage VLED can be increased uniformly. In this case, the voltage (that is, the supply voltage VLED) of the second terminal a of the light string group 21 can be raised uniformly each time. The voltage of the first terminal c of the light string group 21, that is, the voltage of the channel port CH of the driver circuit 301, also increases uniformly each time and is within the range of VL to VH.

Figure 8:
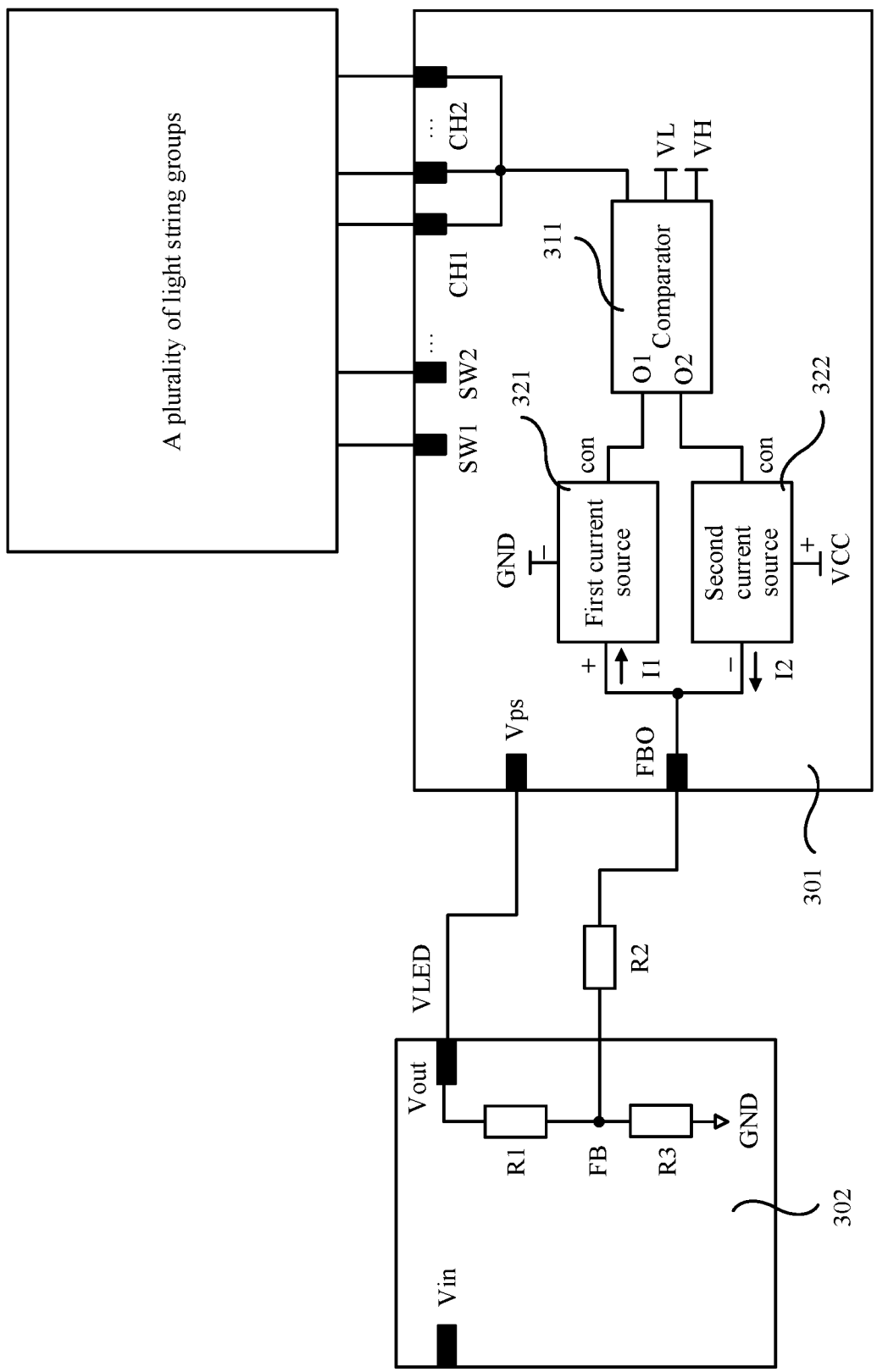
FIG. 8 is a schematic diagram of another connection between a driver circuit, a power conversion circuit, and a plurality of light string groups according to an embodiment of this application.

Based on this, to set a value of the voltage variation ΔV as required, in some embodiments of this application, the power conversion circuit 302 may include a first resistor R1 shown in FIG. 8. For ease of description, a resistance value of the first resistor is also represented by R1. In addition, in the power conversion circuit 302, to enable the voltage output terminal Vout of the power conversion circuit 302 to normally output the supply voltage VLED, a third resistor R3 that is connected to the first resistor R1 in series is further disposed in the power conversion circuit 302.

A first terminal that is of the third resistor R3 and that is away from the first resistor R1 is coupled to the ground terminal GND. The voltage output by the voltage output terminal Vout is divided by the first resistor R1 and the third resistor R3, to obtain a voltage of a node FB. The voltage of the node FB may enter an error determiner (not shown in the figure) of the power conversion circuit 302 to be compared with a reference voltage inside the power conversion circuit 302, so that the voltage output terminal Vout outputs a normal supply voltage VLED.

Based on this, a first terminal of the first resistor R1 is coupled to the voltage output terminal Vout of the power conversion circuit 302, and a second terminal of the first resistor R1 is coupled to the feedback output terminal FBO of the driver circuit 301. In this case, for the foregoing voltage variation $\Delta V$, $\Delta V = |\Delta I| \times R1$.

It should be noted that the resistance value of the first resistor R1 is not limited in this application, and may be set based on a value of the first current I1 and the voltage variation $\Delta V$ used in fine adjustment of the supply voltage VLED each time. For example, in some embodiments of this application, the first current I1 generated by the first current source 321 may be several hundred mA. The voltage variation $\Delta V$ used in fine adjustment of the supply voltage VLED each time may be set to several hundred mV, for example, 300 mV. In this case, the resistance value of the first resistor R1 may be less than 300 K$\Omega$.

Based on this, in some embodiments of this application, the backlight control circuit 30 may further include a second resistor R2, as shown in FIG. 8. A first terminal of the second resistor R2 is coupled to the second terminal of the first resistor R1, and a second terminal of the second resistor R2 is coupled to the feedback output terminal FBO of the driver circuit 301. The second resistor is configured to perform impedance matching on the second terminal of the first resistor R1 and the feedback output terminal FBO of the driver circuit 301.

S203: When the voltages Vch of all the channel ports CH are higher than the second preset voltage VH, the feedback output terminal FBO of the driver circuit 301 provides a second current I2 as the current feedback signal.

To be able to perform S203, the driver circuit 301 may include a second current source 322, as shown in FIG. 7. The second current source 322 is configured to perform S203.

For example, as shown in FIG. 7, a control terminal (Con) of the second current source 322 is coupled to the second output terminal O2 of the comparator 311. A first electrode (for example, a positive electrode "+") of the second current source 322 is coupled to a second voltage terminal VCC. The second voltage terminal VCC is configured to output a second voltage V2. In addition, a second electrode (for example, a negative electrode "−") of the second current source 322 is coupled to the feedback output terminal FBO of the driver circuit 301.

For example, in some embodiments of this application, the second voltage V2 output by the second voltage terminal VCC may be a high level. In this case, a voltage value of the first voltage V1 output by the first voltage terminal, for example, the ground terminal GND, is less than a voltage value of the second voltage V2 output by the second voltage terminal VCC, that is, $|V1| < |V2|$.

In this case, when the comparison result of the comparator 311 is that the voltages Vch of all the channel ports CH are higher than the second preset voltage VH, the second output terminal O2 of the comparator 311 outputs a valid signal that may be referred to as a second control signal. When receiving the second control signal, the control terminal (Con) of the second current source 322 starts to work, and generates the second current I2 that is used as the current feedback signal provided by the feedback output terminal FBO of the driver circuit 301.

The positive electrode "+" of the second current source 322 is coupled to the second voltage terminal VCC, and the negative electrode "−" of the second current source 322 is coupled to the feedback output terminal FBO of the driver circuit 301. Therefore, the second current I2 generated by the second current source 322 may be a source current (source) flowing to the power conversion circuit 302. Based on this, the first current I1 and the second current I2 have opposite directions.

Then, the power conversion circuit 302 decreases, based on the current feedback signal, the supply voltage VLED output by the voltage output terminal Vout.

It can be learned from the foregoing that, when the voltages Vch of all the channel ports CH are higher than the second preset voltage VH, the feedback output terminal FBO of the driver circuit 301 provides the second current I2 as the current feedback signal. In the loop that includes the plurality of light string groups 21, the power conversion circuit 302, and the driver circuit 301, the second current I2 is the source current flowing to the power conversion circuit 302. Therefore, according to the characteristic of a current flowing from a high electric potential to a low electric potential, the supply voltage VLED output by the voltage output terminal Vout of the power conversion circuit 302 decreases on a basis of an original voltage.

Based on this, it can be likewise learned that, when the voltages Vch of all the channel ports CH are higher than the second preset voltage VH for N consecutive times (for example, one time corresponds to two frames, and N times correspond to N×2 frames, where N≥2, and N is a positive integer), the second current I2 provided by the feedback output terminal FBO of the driver circuit 301 decreases by the current variation $\Delta I$ in a step manner each time. In the loop that includes the plurality of light string groups 21, the power conversion circuit 302, and the driver circuit 301, the second current I2 is the source current flowing to the power conversion circuit 302. Therefore, according to the characteristic of a current flowing from a high electric potential to a low electric potential, the power conversion circuit 302 decreases, by the voltage variation $\Delta V$ based on the second current I2 each time, the voltage output by the voltage output terminal Vout, that is, the supply voltage VLED.

In this way, when the voltages Vch of all the channel ports are higher than the second preset voltage VH for N consecutive times, the power conversion circuit 302 decreases, by the same voltage variation $\Delta V$ based on the second current I2 each time, the supply voltage VLED output by the voltage output terminal Vout, so that the supply voltage VLED can be decreased uniformly. In this case, the voltage (that is, the supply voltage VLED) of the second terminal a of the light string group 21 can be decreased uniformly each time. Therefore, the voltage of the first terminal c of the light string group 21, that is, the voltage of the channel port CH of the driver circuit 301, decreases uniformly each time and is within the range of VL to VH.

In conclusion, in FIG. 8, the comparator 311 of the driver circuit 301 may detect the voltages Vch of all the channel ports CH for every frame. The driver circuit 301 may provide the first current I1 (that is, the sink current) based on a detection result of the comparator 311 each time, to raise the supply voltage VLED output by the voltage output terminal Vout of the power conversion circuit 302. Alternatively, the feedback output terminal FBO of the driver circuit 301 may also provide the second current I2 (that is, the source current) based on a detection result of the comparator 311 each time, to decrease the supply voltage VLED output by the voltage output terminal Vout of the power conversion circuit 302. Therefore, the backlight control circuit 30 provided in the embodiments of this application can perform bidirectional adjustment on the voltage of the second terminal a of the light string group 21.

Figure 9:
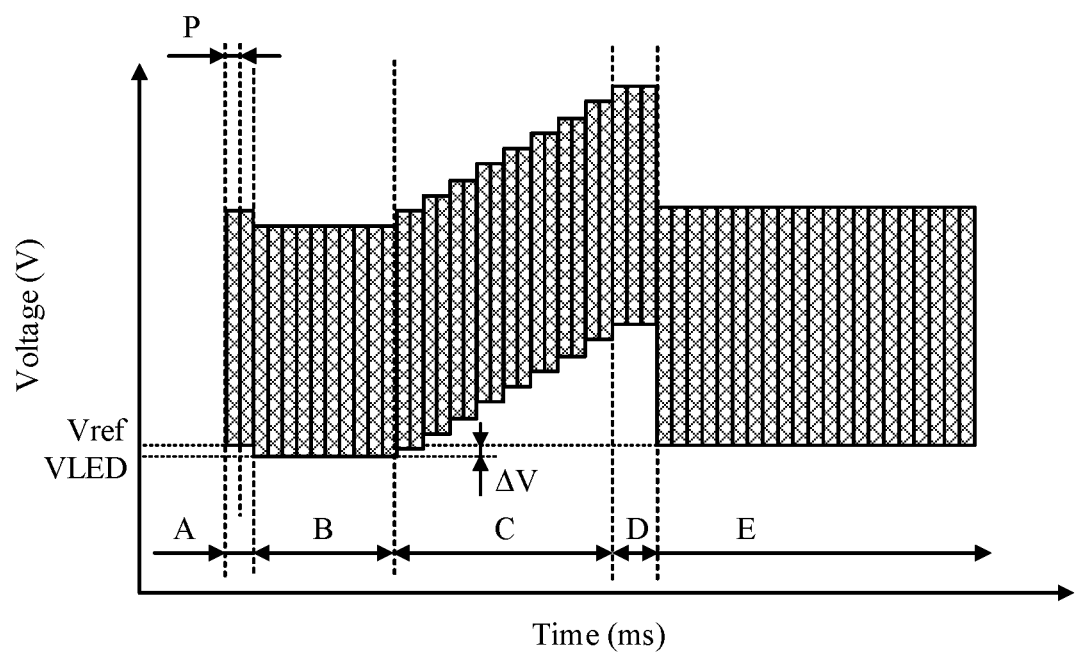
FIG. 9 is a schematic diagram of voltages output by a voltage output terminal of a power conversion circuit in different phases according to an embodiment of this application.

Based on the foregoing method, for example, after the backlight control circuit 30 is powered on, in a first phase A shown in FIG. 9, the voltage output terminal Vout of the power conversion circuit 302 shown in FIG. 8 may provide an initial voltage Vref for the second terminals a of the light string groups 21 by using the power supply port Vps of the driver circuit 301.

When the initial voltage Vref is comparatively high, the comparator 311 of the driver circuit 301 may detect, after a preset time, for example, one frame (duration is P), that voltages Vch of all the channel ports CH are higher than the second preset voltage VH, and output a valid control signal to the control terminal con of the second current source 322.

In this case, the second current source 322 generates a second current I2 (a source current) as a current feedback signal provided by the feedback output terminal FBO. The power conversion circuit 302 decreases, based on the second current I2, a voltage output by the voltage output terminal Vout of the power conversion circuit 302, for example, decreases the voltage by the voltage variation ΔV, so that the voltage output by the voltage output terminal Vout of the power conversion circuit 302 is adjusted to a correct voltage value.

In this case, after a second frame, in a second phase B shown in FIG. 9, the voltage output terminal Vout of the power conversion circuit 302 can continuously output a correct supply voltage VLED to the second terminals a of the light string groups 21.

In addition, when some light emitting devices 202 in the plurality of light string groups 21 in the backlight unit 20 are damaged, causing an open circuit in a light string 200 in which the light emitting devices 202 are located, the control method of a backlight control circuit provided in the embodiments of this application further includes a method for detecting an open circuit in a light string 200.

Specifically, the control method further includes the following steps.

S301: After the first current I1 (that is, the sink current) provided by the feedback output terminal FBO of the driver circuit 301 increases by the current variation ΔI in the step manner for S consecutive times, the feedback output terminal FBO of the driver circuit 301 is in a high-impedance state when the comparator 311 of the driver circuit 301 still determines that the voltage Vch of any channel port CH is lower than the first preset voltage VL, where S≥2, and S is a positive integer. In this case, it is considered that an open-circuit state exists in the light string groups 21, and at least one light string 200 in the light string groups 21 is damaged.

It should be noted that, that the feedback output terminal FBO is in a high-impedance state means that a current of the feedback output terminal FBO is completely released, so that the feedback output terminal FBO has a quite large impedance relative to the reference ground, for example, may be several hundred K Ω, that is, the high-impedance state. In this case, the feedback output terminal FBO does not affect the power conversion circuit 302 any more.

It can be learned from the foregoing that in a process in which the driver circuit 301 is configured to perform S301, in a third phase C shown in FIG. 9, when the comparator 311 of the driver circuit 301 continuously detects the voltages Vch of all the channel ports for every frame, and the comparator 311 of the driver circuit 301 detects that the voltage Vch of any channel port is lower than the first preset voltage VL for S consecutive times (for example, the feedback output terminal FBO outputs the first current I1 once every two frames, and S times are S×2 frames, that is, the comparator 311 detects that the voltage Vch of any channel port is lower than the first preset voltage VL for S×2 consecutive frames), the first current I1 (that is, the sink current) provided by the feedback output terminal FBO of the driver circuit 301 increases by the current variation ΔI in the step manner for S consecutive times, for example, eight times. In this case, a current value of the first current I1 provided by the feedback output terminal FBO of the driver circuit 301 for the $S^{th}$ time is 8ΔxI. The power conversion circuit 302 increases, by the voltage variation ΔV based on the first current I1 each time, the voltage output by the voltage output terminal Vout. The supply voltage VLED output by the voltage output terminal Vout for the $S^{th}$ time increases by 8×ΔV on a basis of an original voltage.

However, in the plurality of light string groups 21, there is a light string 200 that is in the open-circuit state. Therefore, no matter how a voltage value of the supply voltage VLED output by the voltage output terminal Vout of the power conversion circuit 302 is increased, the voltage Vch of the channel port CH, to which the second terminal a of the light string 200 that is in the open-circuit state is coupled, is still lower than the first preset voltage VL.

Therefore, after the third phase C ends, the voltage output terminal Vout of the power conversion circuit 302 outputs the voltage with a final voltage value (VLED+S×ΔV) obtained after S times of raising. When the comparator 311 of the driver circuit 301 still determines that the voltage Vch of any channel port CH is lower than the first preset voltage VL, the feedback output terminal FBO of the driver circuit 301 is in the high-impedance state. The driver circuit 301 may output an open-circuit signal to a control system of the display terminal, to prompt that a light string 200 in the open-circuit state exists in the plurality of light string groups 21, to achieve an objective of open-circuit detection.

S302: The voltage output by the voltage output terminal Vout of the power conversion circuit 302 is restored to the initial voltage Vref.

After the driver circuit 301 may output the open-circuit signal to the control system of the display terminal, to prevent the supply voltage VLED output by the voltage output terminal Vout of the power conversion circuit 302 from being further increased and thereby affecting another normal light string 200, the voltage output by the voltage output terminal Vout of the power conversion circuit 302 is restored to the initial voltage Vref.

In some embodiments of this application, after the third phase C ends, the process may directly enter a fifth phase E shown in FIG. 9, and the voltage output by the voltage output terminal Vout of the power conversion circuit 302 is restored to the initial voltage Vref.

Alternatively, in some other embodiments of this application, after the third phase C ends, a fourth phase D may be added between the third phase B and a fifth phase E. In the fourth phase D, the voltage output terminal Vout of the power conversion circuit 302 keeps outputting the voltage with a voltage value (VLED+(S+1)×ΔV) obtained after S+1 times of raising. In this case, if the comparator 311 of the driver circuit 301 still determines that the voltage Vch of any channel port CH is lower than the first preset voltage VL after the fourth phase D ends, the feedback output terminal FBO of the driver circuit 301 is in the high-impedance state. In this way, the fourth phase D is added to increase a quantity of times of determining the voltages Vch of the channel ports CH, to reduce a probability that the voltages Vch of the channel ports CH are incorrectly determined. Then, the process may enter the fifth phase E shown in FIG. 9, the voltage output by the voltage output terminal Vout of the power conversion circuit 302 is restored to the initial voltage Vref.

Duration of the fourth phase D is not limited in this application. For example, the fourth phase D may include three frames or two frames.

After this, the feedback output terminal FBO of the driver circuit 301 is continuously in the high-impedance state, and the voltage output terminal Vout of the power conversion circuit 302 continuously outputs the initial voltage Vref, so that each light string 200 in each light string group 21 works at the initial voltage Vref.

In addition, after receiving the open-circuit signal, the control system of the display terminal 01 may display alarm information to the user. The user may determine, based on a current display effect of the display terminal 01, whether the light string 200 in the open-circuit state needs to be repaired.

It should be noted that a value of the initial voltage Vref is not limited in this application. A person skilled in the art may perform preliminary estimation based on a value of a forward voltage VF of the light string 200. For example, when a forward voltage VF of one light emitting device 202 at a rated current of 2 mA is 3 V, and each light string 200 includes six light emitting devices 202 connected in series, an initial value of an operating voltage required by a light string group 21 in which the light string 200 is located, that is, the initial voltage Vref, may be about 18 V (6×3 V).

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A backlight control circuit, wherein the backlight control circuit is configured to drive a plurality of light string groups, each of the light string groups comprises a plurality of light strings connected in parallel, and the backlight control circuit comprises:
    a driver circuit, comprising a feedback output terminal and at least one channel port, wherein the at least one channel port is coupled to a first terminal of at least one of the plurality of the light string groups, and the driver circuit is configured to:
    obtain a voltage Vch of each of the at least one each channel port;
    enable the feedback output terminal to provide a current feedback signal based on the voltage Vch;
    a power conversion circuit, coupled to the feedback output terminal and comprising a voltage output terminal, wherein the voltage output terminal is configured to provide a supply voltage for a second terminal of each light string group, and the power conversion circuit is configured to:
    perform voltage conversion on an input voltage; and
    adjust the supply voltage based on the current feedback signal;
    wherein the power conversion circuit comprises a first resistor that has a resistance value R1, a first terminal of the first resistor is coupled to the voltage output terminal, and a second terminal of the first resistor is coupled to the feedback output terminal;
    wherein the driver circuit is further configured to:
    when the voltage Vch of any channel port is lower than the first preset voltage VL for S consecutive times, increase, by a current variation ΔI in a step manner for S consecutive times, the first current I1 provided by the feedback output terminal, wherein S≥2, and S is a positive integer; and
    the power conversion circuit is specifically further configured to increase, by a voltage variation AV based on the first current I1 each time, the voltage output by the voltage output terminal, wherein for the voltage variation, $\Delta V1=|\Delta I|\times R1$.

2. The backlight control circuit according to claim 1, wherein
    the driver circuit is configured to:
    compare the voltage Vch of each of the at least one channel port with the first preset voltage VL and a second preset voltage VH, wherein VL<VH; and
    when the voltage Vch of any channel port is lower than the first preset voltage VL, enable the feedback output terminal to provide the first current I1 as the current feedback signal, to increase the supply voltage; or
    when the voltages Vch of the at least one channel port is higher than the second preset voltage VH, enable the feedback output terminal to provide a second current I2 as the current feedback signal, to decrease the supply voltage, wherein
    the first current I1 and the second current I2 have opposite directions.

3. The backlight control circuit according to claim 2, wherein the driver circuit comprises a comparator, a first current source, and a second current source; an input terminal of the comparator is coupled to the at least one channel port, a first output terminal of the comparator is coupled to a control terminal of the first current source, and a second output terminal of the comparator is coupled to a control terminal of the second current source; the comparator is configured to compare the voltage Vch of each of the at least one channel port with the first preset voltage VL and the second preset voltage VH; and when the voltage Vch of any channel port is lower than the first preset voltage VL, the first output terminal outputs a first control signal, or when the voltages Vch of the at least one channel port is higher than the second preset voltage VH, the second output terminal outputs a second control signal, wherein VL<VH;
    a first electrode of the first current source is coupled to the feedback output terminal, a second electrode of the first current source is coupled to a first voltage terminal, the first current source is configured to receive the first control signal, and the feedback output terminal provides the first current I1;
    a first electrode of the second current source is coupled to a second voltage terminal, a second electrode of the second current source is coupled to the feedback output terminal, the second current source is configured to receive the second control signal, and the feedback output terminal provides the second current I2; and
    the first voltage terminal is configured to output a first voltage V1, and the second voltage terminal is configured to output a second voltage V2, wherein |V1|<|V2|.

4. The backlight control circuit according to claim 1, wherein the backlight control circuit further comprises a second resistor; and a first terminal of the second resistor is coupled to the second terminal of the first resistor, a second terminal of the second resistor is coupled to the feedback output terminal of the driver circuit, and the second resistor is configured to perform impedance matching on the second terminal of the first resistor and the feedback output terminal.

5. The backlight control circuit according to claim 1, wherein the driver circuit is further configured to: after the first current I1 provided by the feedback output terminal increases by the current variation ΔI in the step manner for S consecutive times, determine that the feedback output terminal is in a high-impedance state when the voltage Vch of any channel port is lower than the first preset voltage VL.

6. The backlight control circuit according to claim 1, wherein the driver circuit is further configured to: when the voltages Vch of the at least one channel port is higher than the second preset voltage VH for N consecutive times, decrease, by the current variation ΔI in a step manner for N consecutive times, the second current I2 provided by the feedback output terminal, wherein N≥2, and N is a positive integer; and the power conversion circuit is further configured to decrease, by the voltage variation ΔV based on the second current I2 each time, the voltage output by the voltage output terminal, wherein for the voltage variation, ΔV1=|ΔI|×R1.

7. The backlight control circuit according to claim 1, wherein the driver circuit further comprises a plurality of gating ports and a power supply port that is coupled to each gating port, and the power supply port is further coupled to the voltage output terminal of the power conversion circuit; and the plurality of light string groups are arranged in an array, the second terminals of the plurality of light string groups in a same row are coupled to one gating port, and the first terminals of the light string groups in a same column are coupled to one channel port of the driver circuit.

8. The backlight control circuit according to claim 1, wherein the voltage output terminal of the power conversion circuit is coupled to the first terminal of each light string group.

9. A control method of a backlight control circuit, wherein the backlight control circuit is configured to drive a plurality of light string groups; each light string group comprises a plurality of light strings connected in parallel; the backlight control circuit comprises a driver circuit and a power conversion circuit; the driver circuit comprises a feedback output terminal and at least one channel port; the at least one channel port is coupled to a first terminal of at least one of the plurality of the light string group; and the power conversion circuit is coupled to the feedback output terminal and comprises a voltage output terminal; and the method comprises:
obtaining, by the driver circuit, a voltage Vch of each of the at least one channel port;
enabling the feedback output terminal to provide a current feedback signal based on the voltage Vch; and
adjusting, by the power supply conversion circuit based on the current feedback signal, a supply voltage output by the voltage output terminal;
wherein the power conversion circuit comprises a first resistor that has a resistance value R1, a first terminal of the first resistor is coupled to the voltage output terminal, and a second terminal of the first resistor is coupled to the feedback output terminal; and wherein obtaining, by the driver circuit, a voltage Vch of the channel port, and enabling the feedback output terminal to provide a current feedback signal based on the voltage Vch comprises:
when the voltage Vch of any channel port is lower than the first preset voltage VL for S consecutive times, increasing, by a current variation ΔI in a step manner for S consecutive times, the first current I1 provided by the feedback output terminal, wherein S≥2; and S is a positive integer; and
adjusting, by the power supply conversion circuit based on the current feedback signal, a supply voltage output by the voltage output terminal comprises: increasing, by the power supply conversion circuit by a voltage variation ΔV based on the first current I1 each time, the voltage output by the voltage output terminal, wherein for the voltage variation, ΔV1=|ΔI|×R1.

10. The control method of a backlight control circuit according to claim 9, wherein the obtaining, by the driver circuit, a voltage Vch of the at least one channel port, and providing a current feedback signal comprises:
comparing, by the driver circuit, the voltage Vch of each of the at least one channel port with the first preset voltage VL and a second preset voltage VH, wherein VL<VH; and
when the voltage Vch of any channel port is lower than the first preset voltage VL, enabling the feedback output terminal of the driver circuit to provide the first current I1 as the current feedback signal, to increase the supply voltage; or
when the voltages Vch of the at least one channel port is higher than the second preset voltage, enabling the feedback output terminal of the driver circuit to provide a second current I2 as the current feedback signal, to decrease the supply voltage, wherein
the first current I1 and the second current I2 have opposite directions.

11. The control method of a backlight control circuit according to claim 10, wherein the driver circuit comprises a comparator, a first current source, and a second current source; an input terminal of the comparator is connected to the at least one channel port; a first output terminal of the comparator is coupled to a control terminal of the first current source; a first electrode of the first current source is coupled to the feedback output terminal, and a second electrode of the first current source is coupled to a first voltage terminal; a second output terminal of the comparator is coupled to a control terminal of the second current source; a first electrode of the second current source is coupled to a second voltage terminal, and a second electrode of the second current source is coupled to the feedback output terminal; and the first voltage terminal is configured to output a first voltage V1, and the second voltage terminal is configured to output a second voltage V2, wherein |V1|<|V2|; and the obtaining, by the driver circuit, a voltage Vch of each of the at least one channel port, and providing a current feedback signal comprises:
comparing, by the comparator, the voltage Vch of each of the at least one channel port with the first preset voltage VL and the second preset voltage VH, wherein VL<VH; and
when the voltage Vch of any channel port is lower than the first preset voltage VL, outputting, by the first output terminal of the comparator, a first control signal, receiving, by the first current source, the first control signal, and providing, by the feedback output terminal, the first current I1; or when the voltages Vch of the at least one channel port is higher than the second preset voltage VH, outputting, by the second output terminal of the comparator, a second control signal, receiving, by the second current source, the second control signal, and providing, by the feedback output terminal, the second current I2.

12. The control method of a backlight control circuit according to claim 10, wherein the power conversion circuit comprises a first resistor that has a resistance value R1, a first terminal of the first resistor is coupled to the voltage output terminal, and a second terminal of the first resistor is coupled to the feedback output terminal;

the obtaining, by the driver circuit, a voltage Vch of each of the at least one channel port, and enabling the feedback output terminal to provide a current feedback signal based on the voltage Vch comprises: when the voltages Vch of the at least one channel port is higher than the second preset voltage VH for N consecutive times, decreasing, by the current variation $\Delta I$ in a step manner for N consecutive times, the second current I2 provided by the feedback output terminal, wherein $N \geq 2$, and N is a positive integer; and the increasing or decreasing, by the power supply conversion circuit based on the current feedback signal, a supply voltage output by the voltage output terminal comprises: decreasing, by the power supply conversion circuit by a voltage variation $\Delta V$ based on the second current I1 each time, the voltage output by the voltage output terminal, wherein for the voltage variation, $\Delta V1=|\Delta I|\times R1$.

13. The control method of a backlight control circuit according to claim 9, wherein the method further comprises:

after the first current I1 provided by the feedback output terminal of the driver circuit increases by the current variation $\Delta I$ in the step manner for S consecutive times, determining that the feedback output terminal of the driver circuit is in a high-impedance state when the voltage Vch of any channel port is lower than the first preset voltage VL; and restoring the voltage output by the voltage output terminal of the power conversion circuit to an initial voltage.

14. A driver circuit, wherein the driver circuit comprises a feedback output terminal and at least one channel port; the at least one channel port is coupled to a first terminal of a light string group; and the driver circuit is configured to obtain a voltage Vch of each of the at least one channel port, enable the feedback output terminal to provide a current feedback signal for a power conversion circuit based on the voltage Vch, so that the power conversion circuit adjusts, based on the current feedback signal, an output voltage of a second terminal of the light string group;

wherein the power conversion circuit comprises a first resistor that has a resistance value R1, a first terminal of the first resistor is coupled to the voltage output terminal, and a second terminal of the first resistor is coupled to the feedback output terminal;

wherein the driver circuit is further configured to:

when the voltage Vch of any channel port is lower than the first preset voltage VL for S consecutive times, increase, by a current variation $\Delta I$ in a step manner for S consecutive times, the first current I1 provided by the feedback output terminal, wherein $S \geq 2$, and S is a positive integer; and the power conversion circuit is specifically further configured to increase, by a voltage variation $\Delta V$ based on the first current I1 each time, the voltage output by the voltage output terminal, wherein for the voltage variation, $\Delta V1=|\Delta I|\times R1$.

15. The driver circuit according to claim 14, wherein the driver circuit is configured to:

compare the voltage Vch of each of the at least one channel port with the first preset voltage VL and a second preset voltage VH, wherein VL<VH; and when the voltage Vch of any channel port is lower than the first preset voltage VL, enable the feedback output terminal to provide the first current I1 as the current feedback signal, to increase the supply voltage; or when the voltages Vch of the at least one channel port is higher than the second preset voltage VH, enable the feedback output terminal to provide a second current I2 as the current feedback signal, to decrease the supply voltage, wherein the first current I1 and the second current I2 have opposite directions.

16. The driver circuit according to claim 15, wherein the driver circuit comprises a comparator, a first current source, and a second current source; an input terminal of the comparator is coupled to the at least one channel port, a first output terminal of the comparator is coupled to a control terminal of the first current source, and a second output terminal of the comparator is coupled to a control terminal of the second current source; the comparator is configured to compare the voltage Vch of each of the at least one channel port with the first preset voltage VL and the second preset voltage VH; and when the voltage Vch of any channel port is lower than the first preset voltage VL, the first output terminal outputs a first control signal, or when the voltages Vch of the at least one channel port is higher than the second preset voltage VH, the second output terminal outputs a second control signal, wherein VL<VH;

a first electrode of the first current source is coupled to the feedback output terminal, a second electrode of the first current source is coupled to a first voltage terminal, the first current source is configured to receive the first control signal, and the feedback output terminal provides the first current I1;

a first electrode of the second current source is coupled to a second voltage terminal, a second electrode of the second current source is coupled to the feedback output terminal, the second current source is configured to receive the second control signal, and the feedback output terminal provides the second current I2; and the first voltage terminal is configured to output a first voltage V1, and the second voltage terminal is configured to output a second voltage V2, wherein $|V1|<|V2|$.

* * * * *